United States Patent [19]

Knepler et al.

[11] Patent Number: 4,491,241

[45] Date of Patent: Jan. 1, 1985

[54] GRAIN DRILL MONITOR

[75] Inventors: John T. Knepler, Chatham; Wesley J. Bachman, Auburn, both of Ill.

[73] Assignee: Dickey-john Corporation, Auburn, Ill.

[21] Appl. No.: 338,641

[22] Filed: Jan. 11, 1982

Related U.S. Application Data

[63] Continuation-in-part of Ser. No. 170,719, Jul. 21, 1980, abandoned.

[51] Int. Cl.³ .................. G06F 15/20; G08B 21/00
[52] U.S. Cl. ........................... 221/3; 221/8;
       340/520; 340/684; 364/555; 364/564; 377/6
[58] Field of Search ................ 221/2, 3, 6, 7, 8;
       111/1; 340/501, 518, 520, 608, 609, 617, 674,
       684; 364/478, 479, 551, 555, 564; 377/6, 16, 17,
       24, 26, 32

[56] References Cited

U.S. PATENT DOCUMENTS

| | | | |
|---|---|---|---|
| 2,775,752 | 12/1956 | Hoberman | 340/520 |
| 2,907,015 | 9/1959 | Young | |
| 3,527,928 | 9/1970 | Ryder et al. | |
| 3,537,091 | 10/1970 | Schenkenberg | |
| 3,723,989 | 3/1973 | Fathauer et al. | |
| 3,872,473 | 3/1975 | Melgaard et al. | 340/520 |
| 3,928,751 | 12/1975 | Fathauer | 377/6 |
| 4,009,799 | 3/1977 | Fathauer | 221/3 |
| 4,054,779 | 10/1977 | Wilke | 377/6 |
| 4,058,712 | 11/1977 | Bachman | 364/564 |
| 4,100,538 | 7/1978 | Knepler | 221/6 X |
| 4,159,064 | 6/1979 | Hood | 221/8 |
| 4,206,449 | 6/1980 | Galvin et al. | 340/518 X |
| 4,223,302 | 9/1980 | Hocking | 340/520 X |
| 4,225,930 | 9/1980 | Steffen | 221/8 X |
| 4,238,790 | 12/1980 | Balogh et al. | 340/684 |
| 4,239,010 | 12/1980 | Amburn | 340/684 X |
| 4,268,825 | 5/1981 | Kaplan | 340/684 |
| 4,333,096 | 6/1982 | Jenkins et al. | 221/8 X |
| 4,369,895 | 1/1983 | McCarty et al. | 221/8 X |

*Primary Examiner*—Robert B. Reeves
*Assistant Examiner*—Edward M. Wacyra
*Attorney, Agent, or Firm*—Trexler, Bushnell & Wolters, Ltd.

[57] ABSTRACT

A monitor is provided for a field planting machine having a plurality of planting units and a plurality of seed sensors respectively associated with the planting units for producing seed signals in response to the dispensing of seeds thereby. The monitor comprises a plurality of sensor circuits coupled in series circuit, one of the sensor circuits being coupled intermediate each of the sensors and a common signal line. These sensor circuits and the associated sensors are sequentially selectable for causing a first condition on the common signal line in response to production of seed signals at or above a predetermined rate and a second condition on the common signal line in response to the non-production of seed signals at or above the predetermined rate.

31 Claims, 14 Drawing Figures

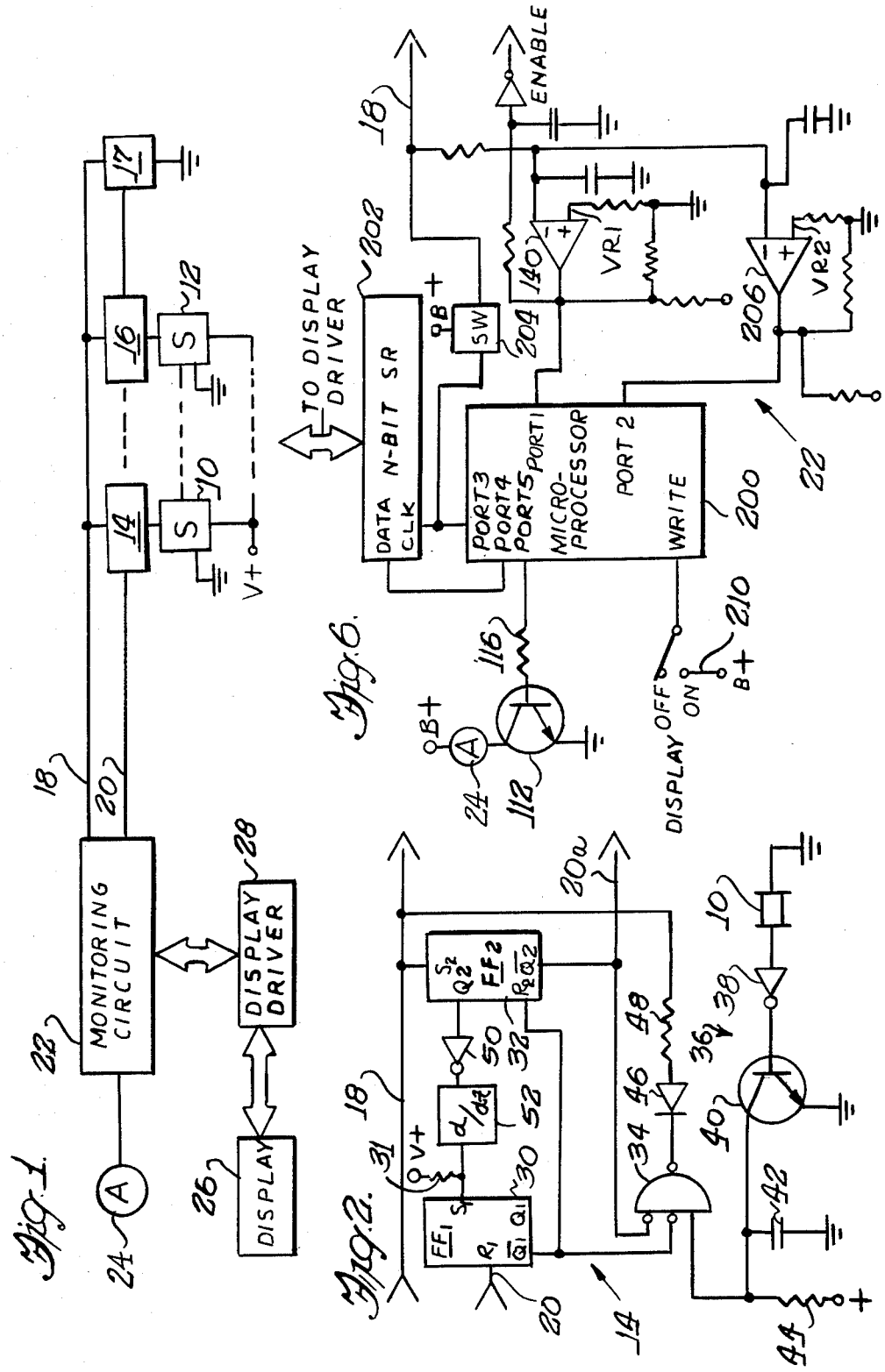

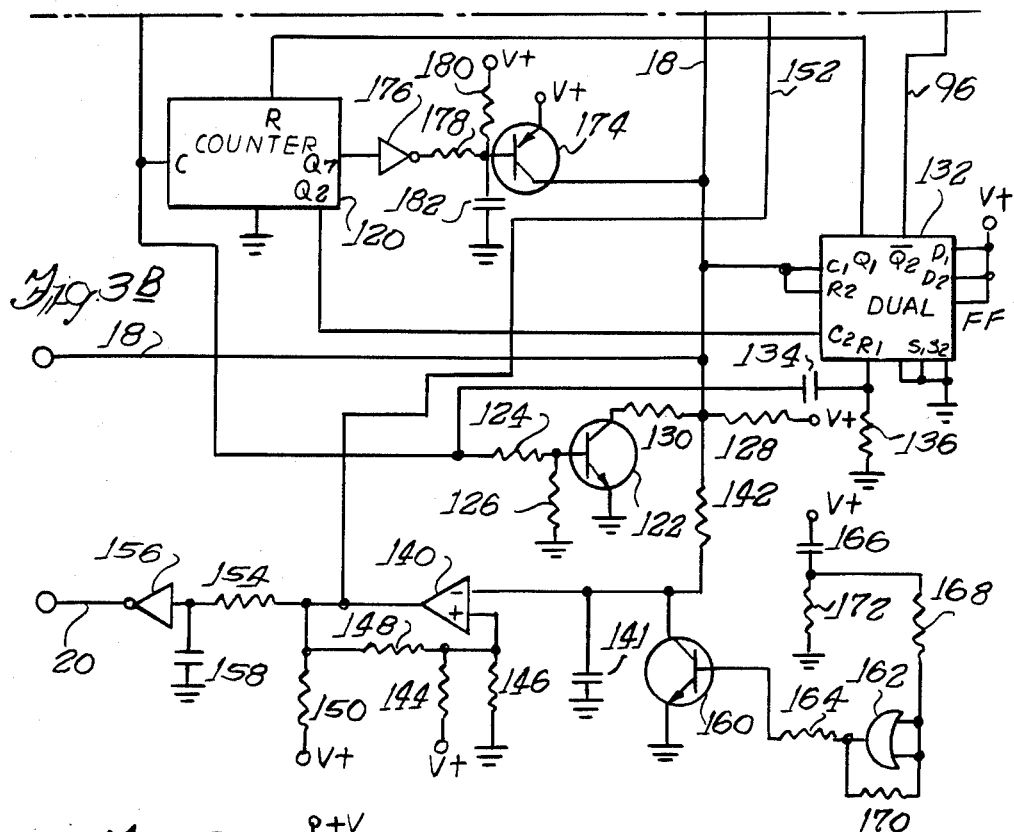
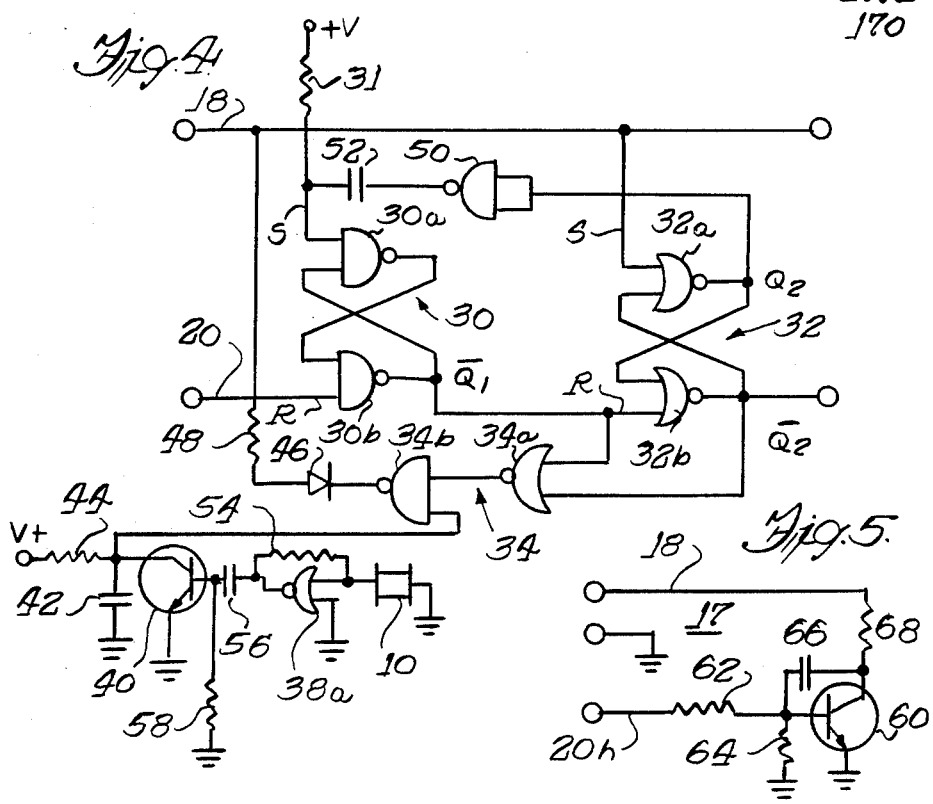

4,491,241

GRAIN DRILL MONITOR

CROSS-REFERENCE TO RELATED APPLICATION

This application is a continuation-in-part of prior application Ser. No. 170,719, filed July 21, 1980, and now abandoned.

BACKGROUND OF THE INVENTION

The present invention is directed generally to the monitoring arts and more particularly to a monitor for complex machinery such as agricultural machinery. While the invention is useful for monitoring the operation of any of a broad variety of machines, the disclosure will be facilitated by specific reference to a field seed planter or grain drill.

A framer engaged in the mechanized planting of seeds or grain generally utilizes a seed planting machine pulled behind a tractor or the like. Modern seed planting machines generally include a plurality of individual planting units which receive seed or grain from one or more hoppers and distribute the seed to individual rows for planting, so that a plurality of rows may be planted in a single pass over the field. In the planting of such crops as corn or soybeans, the planting machine may include as few to as many as twenty-four individual planting units, while machinery for planting grain crops such as wheat may include as many as forty or more individual planting units.

Many arrangements have been heretofore proposed for monitoring the operation of a plurality of such individual planting units in the planting machine and providing a suitable display or other observable indication thereof to a console conveniently mounted to be observed in the tractor cab. The systems heretofore provided, however, have generally required a separate signal lead or wire from a sensor unit associated with each planting unit back to the cab-mounted console.

While such an arrangement has proven quite useful for the planting of corn or soybean seeds in planting machines containing up to 24 planting units, the additional wiring requirements for typical grain drill machines containing 40 or more planting units has presented some difficulty. For example, the proper cabling and interconnection of 40 or more such separate signal leads would prove quite cumbersome and difficult in field assembly of such a monitoring system for all but the highly skilled technician. However, provision of a pre-assembled package of cables and connectors for accommodating such a large number of leads may be economically unfeasable due to the expense it would add to the purchase price of such a preassembled monitoring system. Moreover, since various makes and models of planting machinery and tractors would require different lengths of cables and different configurations of leads, cables and connectors, it would be difficult if not impossible to provide a suitable preassembled cable and connector package for any conceivable arrangement or combination of equipment upon which the monitoring system is to be installed.

Additionally, such a complex cabling and connector arrangement might lead not only to error in the proper assembly of the monitoring equipment in the first instance but also to an increased frequency of equipment failure or malfunction in the field. Moreover, a farmer faced with such equipment failure might well find it difficult or impossible to locate and remedy the source of the equipment malfunction, without the aid of a skilled technician. Since the purpose of such large-scale, multiple row planting equipment is to maximize the acreage which may be planted during the optimum time in the planting season, such an increased frequency of equipment malfunction and the relatively time-consuming repair procedure is clearly undesirable.

OBJECTS AND SUMMARY OF THE INVENTION

Accordingly, it is a general object of this invention to provide a new and improved monitor for a complex machine such as a field planting machine which substantially avoids the problems encountered with prior art devices.

A more specific object is to provide a monitor of the type described which includes relatively simple wiring requirements, so as to be readily assemblable or repairable even by a relatively unskilled worker.

Another object is to provide a monitor of the type described which is relatively simple and economical in its design and manufacture and yet highly reliable in operation.

Briefly, and in accordance with the foregoing objects, the present invention provides a monitor for a machine having a plurality of operating parts and a plurality of sensors respectively associated with the operating parts. The monitor comprises a plurality of sensor circuit means coupled in series circuit, one of said sensor circuit means being coupled intermediate each of said sensors and a common signal line. The sensor circuit means and the associated sensors are sequentially selectable for causing a first condition on said common signal line in response to the production of a predetermined signal by a selected sensor and a second condition on said common signal line in response to the non-production of said predetermined signal by a selected sensor.

BRIEF DESCRIPTION OF THE DRAWINGS

Other objects, features and advantages of the invention will become more readily apparent upon reading the following detailed description of the illustrated embodiment, together with reference to the accompanying drawings wherein:

FIG. 1 is an electrical circuit diagram, primarily in block form, of a novel monitoring system according to the present invention;

FIG. 2 is a circuit diagram, partially in block form, showing additional detail of a sensor circuit portion of the monitoring system of FIG. 1;

FIGS. 3A and 3B, taken together form a detailed circuit diagram of a monitoring circuit portion of the monitoring system of FIG. 1;

FIG. 4 is a detailed circuit diagram of the circuit of FIG. 2;

FIG. 5 is a simplified schematic circuit diagram of a termination portion of the monitoring system of FIG. 1;

FIG. 6 illustrates an alternate embodiment of the circuit of FIGS. 3A and 3B;

DETAILED DESCRIPTION OF THE ILLUSTRATED EMBODIMENT

Figure 3A:
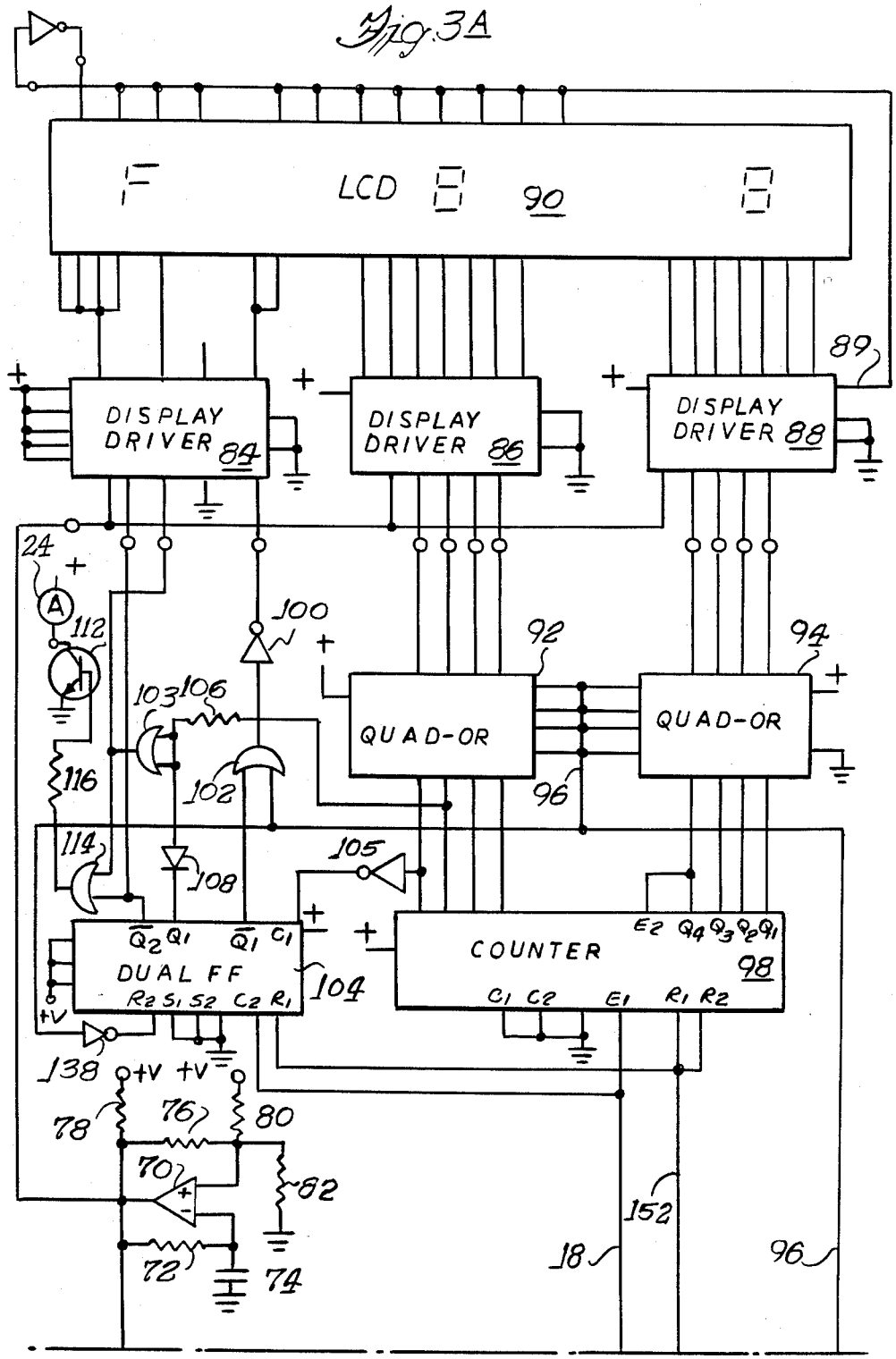

Referring now to the drawings, and initially to FIG. 1, a novel monitoring system in accordance with the invention is illustrated. A plurality of seed sensors, such as sensors indicated by reference numerals 10 and 12, are associated with the respective planting units of a field planter having a plurality of such planting units. While the illustrated embodiment is intended for use with a grain drill having 40 or more planting units, the invention is not so limited, but may be readily utilized with other machines in which a plurality of parts are to be monitored.

Briefly, the seed sensors 10, 12 are responsive to the dispensing of seeds by the associated planting units for producing electrical signals. A sensor circuit or transfer cell 14, 16 is coupled intermediate each of the sensors 10, 12 and a common signal line 18. For convenience of illustration, only the first sensor 10 and its associated sensor circuit 14 and a last sensor 12 and its associated sensor circuit 16 have been illustrated in FIG. 1, it being understood that 40 or more such sensors and sensor circuits are utilized, one for each planting unit on the planting machine to be monitored. Additionally, each of the sensor circuits 14, 16 is provided with a positive voltage supply and a circuit ground connection. A ground is also provided for each sensor 10, 12.

In accordance with a feature of the invention, these sensor circuits 14, 16 are coupled in series circuit, the first sensor circuit 14 being fed by an enable line 20. The common signal line 18 and enable line 20 are coupled at their opposite ends with a monitoring and control circuit portion designated generally by the reference numeral 22. This monitoring and control circuit 22 also drives a suitable alarm indicator 24 and a suitable visual display 26. This latter display 26 is energized by way of a suitable display driver circuit 28.

At the end of this series-connected string of sensor circuits 14, 16 is provided a termination circuit 17. As will be more fully described later, this termination circuit 17 provides a suitable signal indicating that the condition of all seed planting units has been monitored and that the monitoring system may repeat a monitoring sequence, starting from the first sensor circuit 14 and its associated sensor 10 and planting unit.

In operation, the sensor circuits 14, 16 and associated sensors are individually and sequentially selectable for causing a first signal condition on the common signal line 18 in response to the production of a seed signal by the associated one of the seed sensors 10, 12 and a second condition on the common signal line 18 in response to the non-production of a seed signal by the associated one of the seed sensors 10, 12. The monitoring circuit 22 provides suitable signals on the data line 18 and the enable line 20 for sequentially selecting the series-coupled sensor circuits 14, 16, and is further responsive to the first and second signal conditions on the common signal line 18 for producing suitable control signals to the display driver 28 and alarm 24.

In operation, if the planting unit associated with the sensor 10, for example, is not dispensing seeds, when the associated sensor circuit 14 is selected by the monitoring circuit 22, the second signal condition will be detected on the line 18. In response to this signal condition on the line 18, the monitoring circuit will energize the display driver 28 to cause a display on the display unit 26 of a suitable failure signal and a number or other symbol identifying the planting unit associated with the sensor 10. Simultaneously, the monitoring circuit 22 will produce a suitable control signal for energizing the alarm 24 which may take the form of an audible alarm. Should all of the planting units associated with the sensors 10, 12, etc., be dispensing seeds properly, the monitoring circuit 22 will detect only the corresponding first indication signal on the common signal line 18 and hence will not energize the display 26 and alarm 24, which serve primarily as failure indicators to the operator. Hence, in the absence of energization of the display 26 and alarm 24, the operator is assured that all of the planting units of the planting machine are dispensing seeds properly and may continue the planting operation.

Referring now to FIG. 2, a typical sensor circuit, such as the sensor circuit 14, is illustrated in equivalent logic form. In accordance with the feature of the invention, each sensor circuit includes an enable input portion 30 and an enable output portion 32. In the illustrated embodiment, the enable input portion 30 and enable output portion 32 each comprises a flip-flop circuit $FF_1$, $FF_2$ having a set input S, a reset input R, and Q and $\overline{Q}$ outputs. The $\overline{Q}$ outputs $\overline{Q}_1$, $\overline{Q}_2$ of the flip-flops 30 and 32 feed two inputs of a three-input gate circuit 34. The remaining input of this three-input gate circuit 34 is fed from the sensor element 10 by way of circuit 36, here schematically shown, which functions as a one-shot. This one-shot circuit 36 comprises an NPN transistor 40 and an inverter buffer circuit 38 in series between one terminal of sensor 10 and the base electrode of the transistor 40. The collector electrode of the transistor 40 feeds the third input of the gate circuit 34. A suitable capacitor 42 is joined between the collector electrode of the transistor 40 and ground, and a suitable biasing resistor 44 joins the collector electrode of the transistor 40 with a suitable positive voltage supply. The emitter electrode of the transistor 40 and the remaining terminal of the sensor element 10 are tied to ground. Further details of the circuit 36 are illustrated in FIG. 4.

In the illustrated embodiment, the sensor 10, which comprises one of the sensors 10, 12, etc., of FIG. 1, comprises a piezoelectric element. Such a piezoelectric element is particularly suitable for use with grain drill planting units of a grain planting machine. However, other types of sensor elements may be utilized without departing from the principles of the invention. Briefly, as each seed or grain impinges upon the piezoelectric sensor 10, the sensor emits a responsive electrical signal pulse to the inverter buffer circuit 38 which forms the input of the one shot circuit 36. Accordingly, the one-shot circuit 36 is triggered by each signal pulse received from the sensor element 10. The value of the capacitor 42 determines the period of the one-shot circuit 36, which therefore functions as a one-bit memory for storing a seed pulse for this period. Hence, if a seed is dispensed triggering the one-shot 36, a logic zero is input to the gate circuit 34 for the duration of the one-shot "memory" period. Otherwise, this input to the gate 34 will be held substantially at a logic 1 level.

The output of the gate circuit 34 feeds the common signal line 18 by way of a series-connected diode 46 and resistor 48. The diode 46 has its anode electrode joined with the resistor 48 and its cathode electrode joined with the output of the gate circuit 34.

Consequently, if a logic 0 (i.e., a "memorized" seed pulse) is fed to the gate 34 from the "memory", the gate 34, which is an inverting gate, will produce a logic 1 signal to the common signal line 18. However, if there is no "memorized" seed pulse, a logic 1 is fed to the gate 34 and the gate circuit 34 will pull the common signal line 18 toward a logic 0 level. Advantageously, however, the level will vary from the nominal logic 0 of the circuit sufficiently, due to provision of the resistor 48, so as to produce a recognizable failure signal level on the line 18. The monitoring circuit 22 recognizes this failure signal as indicating failure of the associated seed planting unit to dispense seeds at or above the predetermined rate.

Referring again to the flip-flop circuits 30 and 32, it will be seen that the reset input $R_1$ of the flip-flop 30 receives an enabling signal from the monitoring circuit 22 on the enable line 20, while the $\overline{Q}_1$ output of the flip-flop 30 feeds the reset input $R_2$ of the flip-flop 32. The $Q_2$ output of the flip-flop 32 feeds the set input $S_1$ of the flip-flop 30 by way of an intervening series-connected inverter buffer 50 and a time delay element 52. The set input $S_2$ of the flip-flop 32 is connected to receive the signal on the common signal line 18. The $\overline{Q}_2$ output of the flip-flop 32 also feeds an enable signal output line 20a which feeds the enable input circuit of the next succeeding sensor circuit, which input comprises the reset input of a flip-flop corresponding to the flip-flop 30.

In operation, the enable input flip-flop 30 is responsive to the enabling signals received on the enable line 20 from the monitoring circuit 22 for producing an enabling output signal on its $\overline{Q}$ output to the gate circuit 34. Hence, the gate circuit 34 effectively allows the resulting signal from the sensor 10 to be passed on to the common signal line 18 by way of the diode 46 and resistor 48.

Referring again to the enable input circuit 30 and enable output circuit 32, the set input of the flip-flop 30 is initially at a logic 1 state and consequently the $\overline{Q}_1$ output is also at logic 1, effectively disabling response to the "memory" at the gate 34. Upon reception of a first positive enable pulse at the reset input $R_1$ of the flip-flop 30, the $\overline{Q}_1$ output reverts to a logic 0 or low state, while the $\overline{Q}_2$ output of the flip-flop 32 remains at a logic 0 state due to the low transition of the clock pulse on line 18 at the set input $S_2$ thereof and the logic 0 state at the reset input $R_2$ thereof received from the $\overline{Q}_1$ output of the flip-flop 30.

Accordingly, the gate circuit 34 is enabled for effectively interrogating the sensor 10 by ascertaining the condition of the one-shot "memory" 36 associated therewith. If the memory 36 is held at a logic 0 state by continued detection of delivery of seeds at the sensor 10, the output of the gate circuit 34 will remain in a high or logic 1 condition, and hence have no effect on the production of normal periodic clock signal levels on the common signal line 18. Hence, the next transition high of the clock signal on the line 18 will set the flip-flop 32, causing a logic 1 condition on its $\overline{Q}_2$ output, effectively disabling the gate circuit 34 and passing an enable signal out on the line 20a to the next succeeding sensor circuit.

In this regard, the set input $S_2$ of the flip-flop 32 is driven low by the low transition of the clock signal substantially simultaneously with the high transition of the enable signal at the reset input $R_1$ of the flip-flop 30, hence enabling the low transition of the $\overline{Q}_2$ output of the flip-flop 32 in response to the logic 0 signal received at the reset input $R_2$ thereof from the $\overline{Q}_1$ output of the flip-flop 30. Immediately thereafter, the $\overline{Q}_2$ output of the flip-flop 32 is driven to its logic 1 or high state, temporarily pulsing the set input $S_1$ of the flip-flop 30 to a logic 0 state to permit the resetting thereof by the enable pulse received on the line 20. If the gate 34 allows the next succeeding positive clock transition on the line 18, however, the set input $S_2$ of the flip-flop 32 will again be driven to a logic 1 state, driving the $Q_2$ output thereof to the logic 0 state at the same time as the transition of the $\overline{Q}_2$ to the logic 1 state, hence preventing succeeding enable signals received on the line 20 from enabling the sensor circuit 14 by again resetting the flip-flop 30.

Referring briefly to FIG. 4, a detailed circuit diagram of a typical sensor circuit 14 illustrates preferred forms of the components illustrated in equivalent logic form in FIG. 2. The enabling input circuit or flip-flop 30 is formed from a pair of NAND gates 30a and 30b, while the enabling output circuit or flip-flop 32 is similarly formed from a pair of NOR gates 32a and 32b. The inverter 50 comprises a two-input NAND gate having its two inputs tied together to the $Q_2$ output of the flip-flop 32. The time delay element 52 comprises a capacitor joined in series between the output of the gate 50 and the set input of the flip-flop 30. The gate circuit 34 comprises a two-input NOR gate 34a which receives the $\overline{Q}_1$ and $\overline{Q}_2$ outputs of the flip-flops 30 and 32 and whose output feeds one input of a two-input NAND gate 34b. The remaining input of the NAND gate 34b is fed from the capacitor 42, of the circuit 36 associated with the sensor 10. The inverter buffer 38 is formed from a two-input NOR gate 38a having one input tied to the sensor 10 and a second input tied to ground. A suitable feedback resistor 54 joins the output of the gate 38a with its input from the sensor 10. A capacitor 56 is interposed between the output of the gate 38a and the base electrode of the transistor 40 and a resistor 58 runs to ground from the junction of these two components. The capacitor 42 and the resistor 44 as well as the diode 46 and resistor 48 are the same as illustrated in FIG. 2.

Reference is next invited to FIG. 5 wherein a preferred form of the termination circuit 17 is illustrated. The last enabling input line 20n feeds the base electrode of a transistor 60 by way of a series-connected resistor 62. A suitable resistor 64 joins the base electrode of the transistor 60 with ground while a capacitor 66 is interposed between the base electrode and the collector electrode thereof. The common signal line 18 feeds the collector electrode of the transistor 60 by way of a suitable series-connected resistor 68, while the emitter electrode of the transistor 60 is grounded. Accordingly, upon reception of the enabling output signal on the line 20n from the last of the series-connected sensor circuits, the transistor 60 will be switched on, effectively grounding the common signal line 18. This ground condition will be substantially at circuit ground which is at a recognizable level somewhat lower than the nominal logic 0 level. This ground signal will result in suitable signal levels on both the line 18 and the enable line 20 from the monitoring and control circuit 22 for effectively resetting all of the sensor circuits 14, 16, etc., in a ripple-effect fashion, so as to permit a subsequent "scan" through the series-connected sensor circuits for determining the condition of the respective associated sensors.

Reference is next invited to FIGS. 3A and 3B wherein a first exemplary embodiment of the monitoring and control circuit 22 is illustrated in schematic form. Referring initially to FIG. 3A, at the lower left hand portion, a master clock oscillator is formed utilizing an operational amplifier (op amp) 70. A feedback resistor 72 joins the inverting input of the op amp 70 with the output thereof and a suitable capacitor 74 is joined between the inverting input and ground. The non-inverting input of the op amp 70 is provided with a similar feedback resistor 76 to the output thereof, either side of the resistor 76 being coupled with a positive voltage supply by way of suitable intervening resistors 78 and 80. A further resistor 82 ties the non-inverting input of the op amp 70 to ground, thereby completing the oscillator. The oscillations at the output of the op amp 70 are fed to display frequency input terminals of three display driver elements 84, 86, and 88 which form the display driver 26 of FIG. 1.

In the illustrated embodiment, the display driver element 84 is of the type generally designated 4054 while the elements 86 and 88 are the type generally designated 4055. These display drivers 84, 86 and 88 energize a liquid crystal display (LCD) 90, which in the illustrated embodiment comprises three seven-segment display characters. The back plate, decimal point characters and unused character segments are driven to suitable potentials by the strobe output 89 of the display 88.

In the illustrated embodiment, the liquid crystal display (LCD) 90 and display drivers 86 and 88 are interconnected so as to display two numerals identifying any failed planting unit. The display driver 84 controls display character segments to display alpha-numeric F indicating a failure of the planting unit whose identifying number is simultaneously displayed. The display drivers 86 and 88 are driven by a pair of quad OR gates 92, 94, each OR gate therein receiving one input from a common line 96 and the other input from the outputs of a dual up-counter 98, which is wired as a two-digit BCD counter. The inputs of the display driver 84 are driven from suitable logic including an inverter 100 driven from the output of an OR gate 102, one of whose inputs is tied to the signal line 96 and the other of whose inputs is fed from a $\overline{Q_1}$ output of a dual flip-flop circuit 104. The highest stage output of the counter 98 drives the first clock input $C_1$ of the dual flip-flop 104 by way of an inverter buffer 105. A second $\overline{Q_2}$ output of the dual flip-flop 104 drives a further input of display driver 84 while the remaining input thereof is driven from the output of a two-input OR gate 103, both of whose inputs are tied to the third stage of the most significant digit of the counter 98 and by way of a diode 108 to the $Q_1$ output of the dual flip-flop 104.

A suitable audible alarm 24 has one terminal tied to a positive voltage supply and the other terminal tied to the collector electrode of a transistor 112 whose emitter electrode is grounded. Accordingly, the alarm will be energized when the transistor is switched to an ON state at its base electrode. This base electrode is tied to the output of a two-input OR gate 114 by way of a suitable intervening resistor 116. One input of this OR gate 114 is fed from the output of the OR gate 103 while the remaining input thereof is fed from the $\overline{Q_2}$ output of the dual flip-flop 104.

Referring now also to FIG. 3B, a seven-stage binary counter 120 takes its count input C from the oscillator signal provided at the output of the op amp 70. This same oscillator signal also feeds the base electrode of an NPN transistor 122 by way of a resistor 124, the transistor 122 comprising an electronic switch element. The base electrode of the transistor 122 is also provided with a suitable resistor 126 to ground while the emitter electrode thereof is grounded. The collector electrode of the transistor 122 receives a positive potential by way of a pair of series-connected resistors 128 and 130, the junction of which is coupled to the common signal line 18. Accordingly, the periodic clock signal on the common signal line 18 is effectively an inverted version of the oscillator output signal, derived from the action of the electronic switch comprising the transistor 122. The last stage output $Q_7$ of the counter 120 drives a further electronic switch comprising a PNP transistor 174, by way of an inverter buffer 176 and a resistor 178 in series to the base electrode thereof. Suitable biasing and pulse shaping is provided at the base electrode of the transistor 174 from the junction of a resistor 180 and capacitor 182 tied in series between a positive potential ground. The emitter electrode of the transistor 174 is tied to a positive potential while the collector electrode thereof is fed to the common signal line 18.

The oscillator signal from the output of op amp 70 also feeds a first reset input $R_1$ of a dual flip-flop circuit 132 by way of a differentiating or pulse forming circuit comprising a capacitor 134 in series to the $R_1$ input and a resistor 136 from the $R_1$ input to ground. The set inputs $S_1$, $S_2$ of the dual flip-flop 132 are tied to ground while the inputs $D_1$ and $D_2$ thereof are tied to a positive voltage supply. The first clock input $C_1$ and second reset input $R_2$ of the dual flip-flop 132 are both tied to the common signal line 18, while the second clock input $C_2$ thereof is tied to the $Q_2$ or second stage output of the counter 120. The $Q_1$ output of the dual flip-flop 132 drives the reset input R of the counter 120 while the $\overline{Q_2}$ output thereof drives the signal line 96 of FIG. 3A. This signal line 96 also feeds the second reset input $R_2$ of the dual flip-flop 104 by way of a series-connected inverter buffer 138.

A termination detector circuit for detecting the termination signal provided by the termination circuit 17 as discussed above, comprises an operational amplifier (op amp) 140 whose inverting input is joined with the common signal line 18 by a pulse forming network comprising a series-connected resistor 142 and a capacitor 141 to ground. The non-inverting input of this op amp 140 is biased by a voltage divider comprising a pair of resistors 144 and 146 in series between a suitable positive potential and ground. The op amp 140 is further provided with a suitable feedback resistor 148 between its output and its non-inverting input and the output is biased by a further resistor 150 tied to a positive potential. The output of the op amp 140 also energizes the reset inputs $R_1$, $R_2$ of the counter 98 and the reset input $R_1$ of the dual flip-flop 104 of FIG. 3A via a line 152. The enable signal line 20 is also derived from the output of the op amp 140 by way of a series-connected resistor 154 and inverter buffer 156. The junction of the resistor 154 and the inverter buffer 156 is also provided with a capacitor 158 to ground to provide suitable pulse shaping.

The biasing of the op amp 140 is such that the enable signal will remain at a high or logic 1 state at all times, that is, so that the clock signals on the line 18 will not drive the op amp to its low or logic 0 output state. However, upon encountering the termination detector, which it will be remembered presents a relatively lower, ground signal level, the op amp 140 will be momentarily switched to its opposite state to drive the enable line to a low or logic 0 level state.

A suitable circuit for providing the correct logic signals upon "power up" or initial energization of the circuits of FIGS. 3A and 3B is also provided in FIG. 3B. This circuit utilizes an NPN transistor 160 whose collector electrode is tied to the inverting input of op amp 140 and whose emitter is grounded. A suitable switching signal on "power up" is supplied to the base of the transistor 160 from the output of a two-input OR gate 162 by way of a suitable series-connected resistor 164. The two inputs of the OR gate 162 are tied together and received a suitable "power up" pulse from a positive voltage supply by way of a series-connected capacitor 166 and resistor 168. A feedback resistor 170 is tied between the output of the OR gate 162 and its inputs, and a suitable biasing resistor 172 is also provided at the junction of the capacitor 166 and resistor 168.

In operation, the periodic clock signal provided on the line 18 repeatedly clocks the $R_2$ input of the dual flip-flop 132, resulting in a logic 1 signal at its $\overline{Q}_2$ output on the line 96. This logic 1 signal on the line 96 holds all of the quad OR gates 92 and 94 high, thereby disabling the display drivers 86, 88 and blanking the numeric characters of the LCD 90 utilized to identify a failed planting unit. This logic 1 level on the line 96 also effectively disables the display driver 84 by way of the above-described intervening logic elements, thereby blanking the failure character of the LCD 90. As the series-connected sensor circuits are enabled and interrogated one-by-one if no failure is detected, the clock signal on the line 18 will continue its periodic excursion between logic 1 and logic 0 uninterrupted, thus holding the display in its blanked condition, while at the same time advancing the count held in the counter circuit 98 by way of the enable input $E_1$ thereof. Hence, the state of the counter 98 will always comprise a BCD digit, corresponding to the numerical identity of the sensor circuit and associated planting unit currently being interrogated.

Moreover, upon the normal, uninterrupted clock transitions on the common signal line 18, the counter 120 is repeatedly reset due to the application of the clock signal on the line 18 to the count input $C_1$ of dual flip-flop 132, whose $Q_1$ output then resets the counter 120 at its R input. However, upon encountering a failed sensor condition, it will be remembered that the clock signal on the common signal line is not allowed to return to its nominal logic level but is instead pulled to a low signal level. Accordingly, the counter 120 will not be reset when this condition is encountered but will begin to count the clock pulses presented at the count input C thereof, directly from the op amp 70. The second clock pulse thus received will be fed from the $Q_2$ output of the counter 120 to the $C_2$ input of the dual flip-flop 132, causing a logic 0 on the $\overline{Q}_2$ output thereof and thus on the line 96, enabling the quad OR gates 92 and 94 and other logic and removing the blanking condition from the LCD 90. Accordingly, the identifying number of the failed planting unit held in the counter 98 will be displayed in the digits of the LCD 90, together with the failure display character "F". The same signal transition on the line 96 will reset the $R_2$ pin of dual flip-flop 104, thus triggering the audible alarm 110 by means of a logic signal at the $\overline{Q}_2$ output thereof.

In one-half to one second, depending upon the frequency of operation chosen for the oscillator comprising the op amp 70 and related components, the counter 120 will reach its last stage, emitting a logic 1 signal from its $Q_7$ output. This logic 1 signal will switch the transistor 174 on, thus once again pulling the line 18 to its logic 1 or high state. As described above with reference to FIGS. 2 and 4, when the line 18 is again returned to its logic 1 or high state, it will be remembered that the sensor circuit effectively disables or discontinues the interrogation of the associated sensor and passes the enabling signal on to the next succeeding series-connected sensor circuit. Accordingly, the clock signal on the common signal line 18 will resume its periodic transitions, to interrogate remaining sensors in the same fashion.

Accordingly, the sequential scan of the series-connected sensor circuits will continue, interrupted only for the one-half to one second failure display and alarm upon encountering sensor circuits whose associated planting units are not dispensing seeds at or above the predetermined rate. Upon encountering the termination circuit 17, the resulting signal state transition of the op amp 140 will reset the counter 98 by way of the line 152, to resume counting from 0 as the scan of the series-connected sensor circuits is repeated starting with the first sensor circuit. The signal on the line 152 also resets the dual flip-flop 104. Should a malfunction occur in the termination circuit 17 or the termination sensing arrangement comprising the op amp 140 in related components, the counter 98 will continue to count upwardly, thus triggering the failure signal and the audible alarm by way of the intervening logic elements including the inverter buffer 105, OR gate 103 and dual flip-flop 104, whose interconnections are described above. Accordingly, as a failure signal "F" will be displayed without a planting unit identifying number, the operator will be alerted to check for the proper connection of the termination unit at the end of the string of series-connected sensor circuits.

Referring now to FIG. 6, an alternate embodiment of the monitoring and control circuit 22 is illustrated. In this embodiment, the majority of the logic functions described above with reference to FIGS. 3A and 3B are carried out by a microprocessor component 200 which may be any of a plurality of known microprocessor elements commercially available. The programming of such a microprocessor will be apparent to one skilled in the art upon the following description of the function thereof.

The microprocessor 200 is provided with five input/output ports, identified as port 1, port 2, etc., in FIG. 6. Port 1 receives the output signal from the termination detector, operational amplifier 140, which is the same as that illustrated and described above with reference to FIG. 3B. An internal oscillator circuit provides a clock signal output at port 3 which drives the clock input of an N-bit shift register 202 and an electronic switch 204 for driving the common signal line 18 from a suitable positive potential B+. This switch circuit 204 may comprise the transistor 122 and related circuit elements described above with reference to FIG. 3B or any other suitable equivalent electronic switching circuit.

Port 2 of the microprocessor 200 receives an input signal from a second, similar operational amplifier 206, which is provided with suitable biasing components similar to those described above with respect to the op amp 140 of FIG. 3B. The reference potential or biasing level provided to the op amp 206 is such, however, as to activate port 2 of the microprocessor 200 upon encountering a failed planting unit. It will be remembered that the signal level presented on the common data line 18 by the sensor circuits in response to a failure of a planting unit to dispense seeds is somewhat different from the normal or nominal logic 1 and 0 levels provided by the clock signal thereon. Accordingly, the op amp 206 is referenced to this "failure" signal level. Port 4 of the microprocessor 200 comprises a serial data output port to a serial data input of the N-bit shift register 202. The N parallel outputs of the N-bit shift register 202 feed the display driver 28 for the display 26, which may take the form illustrated and described with reference to FIG. 3A. Alternatively, the display may contain any desired number of display elements comprising some number N of segments or ports to be driven by the N-bits of the N-bit shift register 202 to provide a suitable display as desired. An additional output is provided at port 5 of the microprocessor 200 for driving the audible alarm element 24 by way of a suitable transistor 112 and resistor 116, in similar fashion to that illustrated and described above with reference to FIG. 3A.

In operation, the microprocessor 200 effects a relatively rapid sequential scanning of the sensor circuits 14, 16, etc., preferably at a rate of on the order of 10 kHz. If a failed planting unit is detected, the corresponding signal provided by the op amp 206 to port 2 of the microprocessor 200 will be internally stored therein, together with suitable data, generated internally, identifying the failed planting unit. Data corresponding to the failed planting units encountered may then be read out of the microprocessor 200 for display whenever desired by actuation of a "write" terminal thereof. A suitable display ON-OFF switch 210 is provided for this purpose. Consequently, the monitoring and control circuit as embodied in FIG. 6 permits substantially constant monitoring of all of the planting units by way of their associated series-connected sensor circuits 14, 16, etc., due to the relatively high scanning rate thereof. The display of suitable characters indicating failed planting units encountered during the scan may be accomplished independently of the scan, in "real time", whenever desired by the operator.

As a specific example to which no limitation is intended, in the embodiment illustrated in FIGS. 3A and 3B the following commercially available integrated circuit components may be utilized:

| Reference No. | Commercial No. |
| --- | --- |
| 84 | 4045 |
| 86,88 | 4055 |
| 92,94 | 4071 |
| 98 | 4518 |
| 104,132 | 4013 |
| 120 | 4024 |

Referring now to FIGS. 7 through 10, additional circuitry may be readily provided for accommodating other sensors associated with the grain drill or seed planting machine. For example, one or more hopper level sensors may be provided for sensing the level of grain in the hopper or hoppers of the planting machine.

Figure 9:
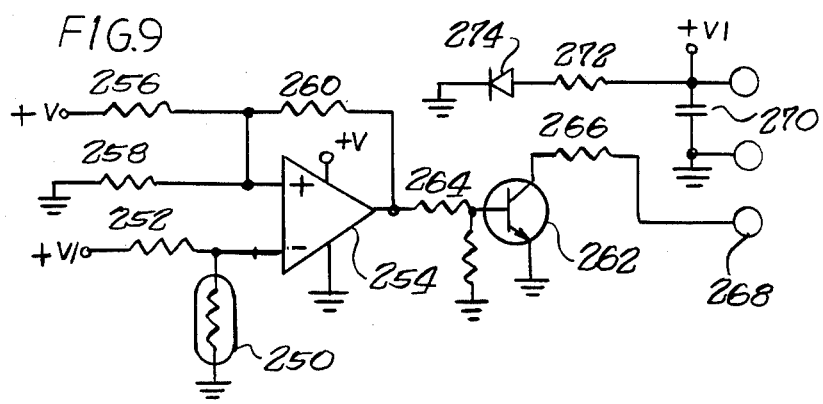
FIG. 9 is a schematic circuit diagram of a further hopper level sensor circuit portion useful with the circuit of FIG. 7.
Figure 11A:
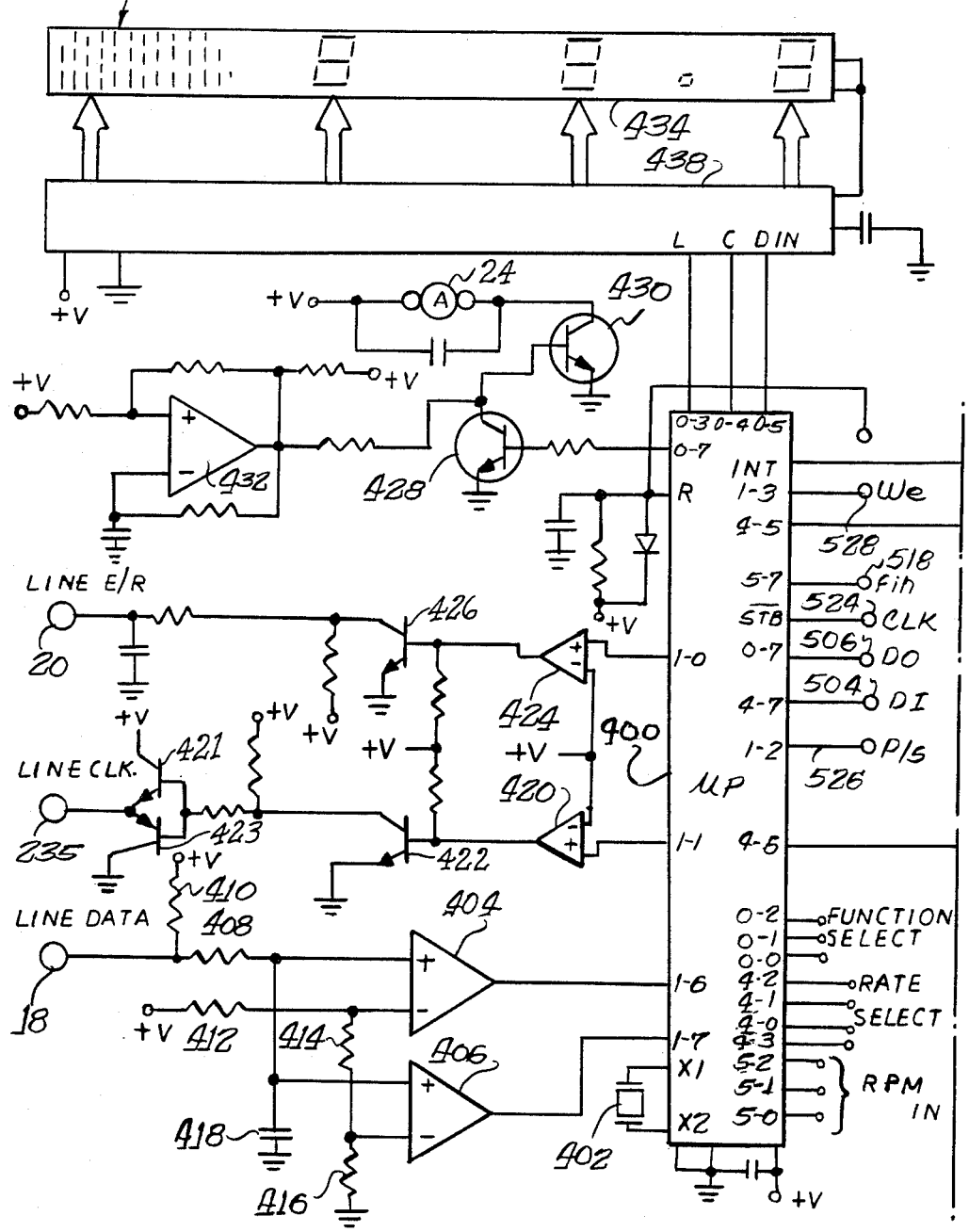
FIGS. 11A and 11B, together form a schematic circuit diagram illustrating another embodiment of a monitoring circuit.
Figure 10:
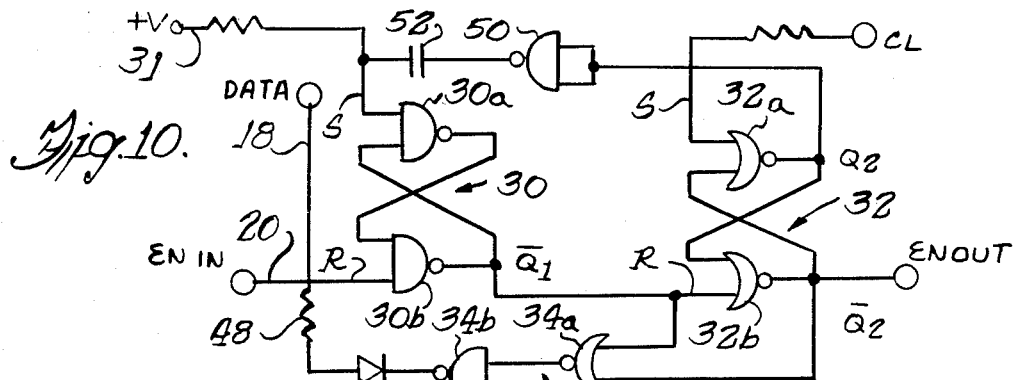
FIG. 10 is a schematic circuit diagram of another modified form of a sensor circuit for use with the circuit of FIGS. 1A and 1B.
Figure 11B:
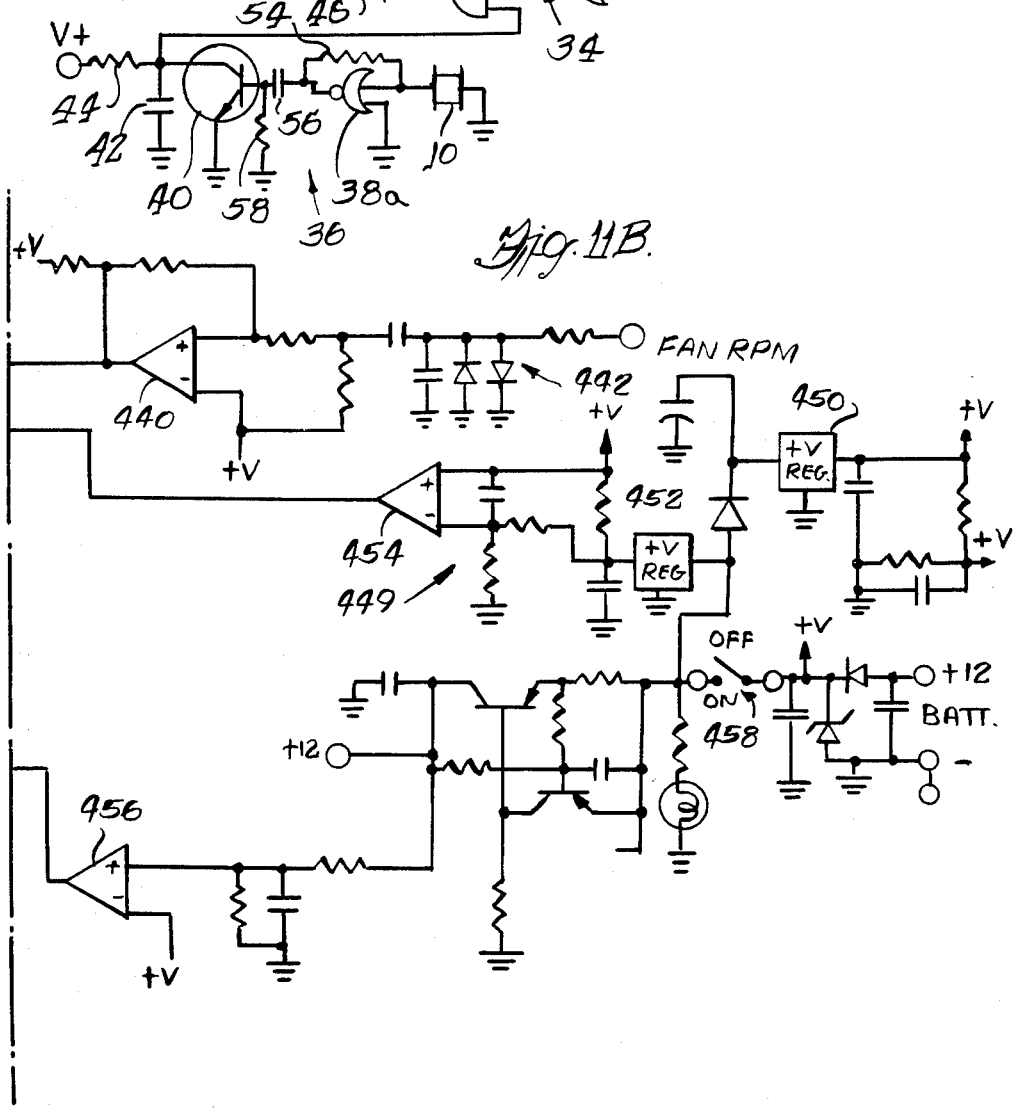

The circuits of FIGS. 7 through 10 are preferably used in conjunction with a microprocessor-based monitoring circuit, as shown in detail in FIGS. 11A and 11B. The operation of the invention with this microprocessor-based circuit presents certain additional features and advantages which will be discussed presently.

Figure 7:
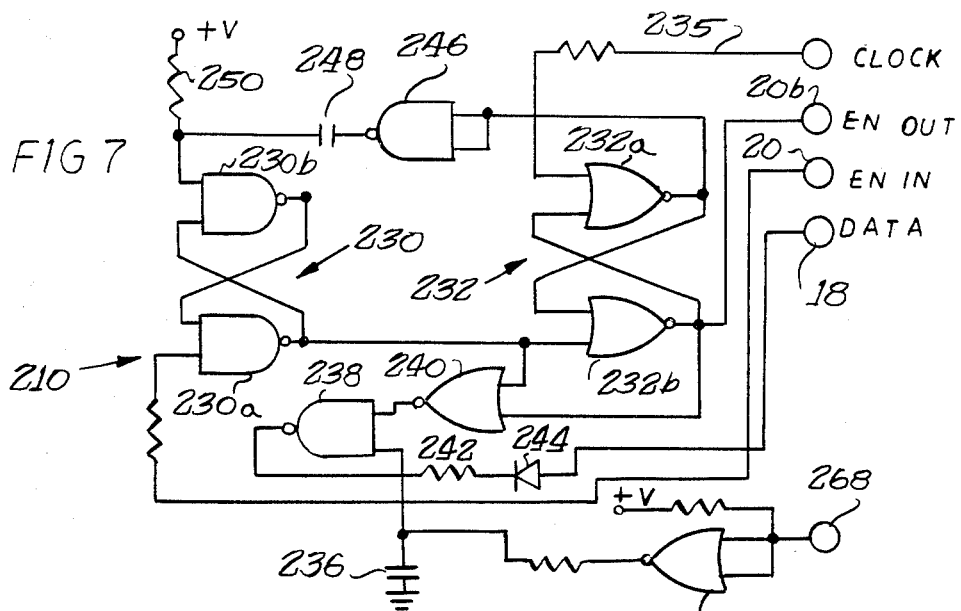
FIG. 7 is a schematic circuit diagram of a modified sensor circuit for accommodating a hopper level sensor.

In FIG. 7 a further sensor circuit or transfer cell 210 similar to that illustrated and described above with reference to FIG. 4 is illustrated. This transfer cell 210 receives signals from a hopper level sensor by way of a suitable sensor interface circuit illustrated in FIG. 9. Briefly, the transfer cell 210 of FIG. 7 comprises an enabling input circuit or flip-flop 230 comprising a pair of NAND gates 230a and 230b. A similar, enabling output circuit or flip-flop 232 comprises a pair of NOR gates 232a, 232b.

Hopper level sensor signals provided by one or more circuits such as the circuit of FIG. 9 are input at a terminal 268 to both inputs of a two-input NOR gate 234, this input being further provided with a suitable positive voltage pullup. The output of the NOR gate 234 feeds the junction of a capacitor 236 with one input of a two-input NAND gate 238. The other input of this NAND gate 238 is fed from the output of a two-input NOR gate 240 which receives its input from respective outputs of the two flip-flops 230 and 232. The output of the NAND gate 238 feeds the common data line 18 by way of a suitable resistor 242 and diode 244. In similar fashion to the circuit of FIG. 4, an inverter comprising a two-input NAND gate 246 receives both of its inputs from a remaining output of the flip-flop 232 and feeds a second input of the flip-flop 230 by way of a time delay capacitor 248 and voltage pullup resistor 250.

The enable input line 20 is fed to the remaining input of the flip-flop 230, while an enable output line 20b is fed from the output of the flip-flop 232. Preferably, this transfer cell 210 is interposed in the enable line 20 from the monitoring circuit 22 (see FIG. 1) ahead of the first seed sensor 10 and its associated transfer cell 14. Hence, with reference to FIG. 11, a microprocessor may be arranged to interrogate one or more hopper level sensors prior to interrogating the individual seed sensor transfer cells. A clock line 235 is energized from the microprocessor of FIG. 11 for clocking the remaining input of the flip-flop 232. Similarly, when this microprocessor is utilized, as will be described later, this clock line 235 is utilized to clock the "S" inputs of all of the enable output flip-flops 32 (see FIG. 4) of the sensor transfer cells 14, 16 etc., the data line 18 being used only to receive the data from the memories of each sensor circuit. This modified transfer cell or sensor circuit is illustrated in FIG. 10. The circuit of FIG. 10 is substantially identical in structure and operation to the circuit of FIG. 4, aside from the provision of the clock line 235 separate from the data line 18. Hence, further description of the circuit of FIG. 11 is unnecessary.

Referring briefly to FIG. 9, a hopper level sensor may comprise a light sensitive resistor 250 which is set at a predetermined level in a hopper to produce a detectable change in its output signal when the seed or grain falls below that level. This sensor 250 forms a voltage divider with a resistor 252 and reference voltage +V1, the divided voltage feeding the inverting input of an operational amplifier 254. This operational amplifier receives a reference voltage at its non-inverting input from the junction of a pair of resistors 256, 258 coupled in series between a suitable positive potential ground. A feedback resistor 260 is also provided from the output of the op amp 254 to its non-inverting input. The output of the op amp 254 also feeds a suitable switching transistor 262 which in the illustrated embodiment comprises a grounded-emitter NPN transistor. A suitable current limiting resistor 264 is placed in series between the base electrode of the transistor 262 and the output of the op amp 254. A further suitable current limiting resistor 266 extends from the collector or output terminal of the switching transistor 264 and a terminal 268 which forms the input to the gate 234 of FIG. 7. The reference voltage +V1 is provided by a circuit comprising a capacitor 270, a resistor 272 and a diode 274 as illustrated in FIG. 9, which may be energized from a 12 volt battery, for example, the battery of a tractor which pulls the planting machine.

Figure 8:
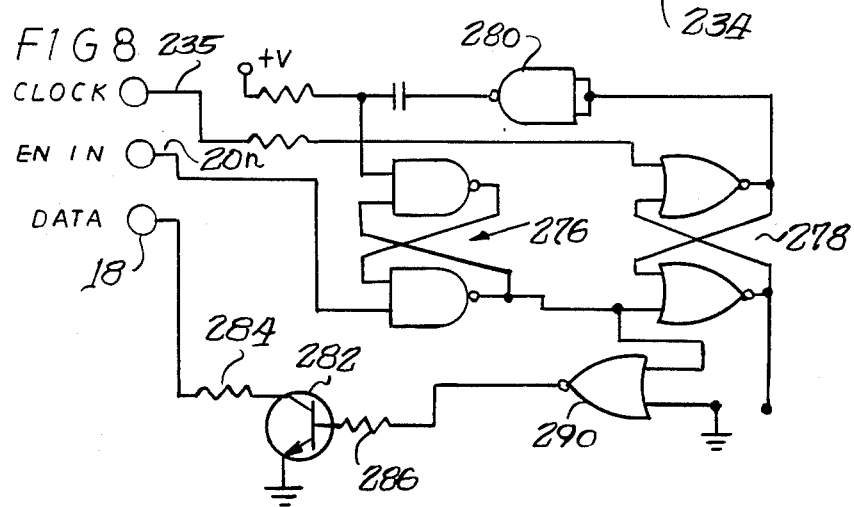
FIG. 8 is a schematic circuit diagram of a modified termination circuit.

Referring now briefly to FIG. 8 an alternative form of the termination circuit of FIG. 5 is illustrated. Briefly, this termination circuit includes an input enable flip-flop 276, an output enable flip-flop 278 and an interconnecting inverter in the form of a NAND gate 280. An enable input line 20n and feeds one input of the enable input flip-flop 276 and the clock line 235 feeds the input of the flip-flop 278.

The data line 18 is fed from a grounded emitter NPN switching transistor 282 by way of a suitable series-connected resistor 284. The transistor 282 receives an input at its base electrode through a series resistor 286 from the outputs of a pair of similar two-input NOR gates 288, 290. One input of each of these NOR gates 288, 290 is fed from the same output of the flip-flop 276 which feed one input of the flip-flop 278. The remaining input of both of these NOR gates 288, 290 is fed in common from the remaining output of the flip-flop 278. Hence, a recognizable terminal signal will be given to the data line 18 upon enabling and clocking of the terminal circuit of FIG. 8. This signal indicates to the microprocessor (FIG. 11) that the last seed sensor in the string has been interrogated and read.

Referring now to FIG. 11A and FIG. 11B, a preferred embodiment of a microprocessor-based monitoring and control circuit is illustrated in circuit schematic form. This circuit is preferably used with the sensor circuits of FIGS. 7 through 10, as mentioned above.

A microprocessor 400 preferably comprises a single-chip microcomputer of the type generally designated MK3870/22. This microprocessor 400 includes a plurality of input/output ports, designated by hyphenated numbers indicating first the port number and second the bit number (e.g., 1-0 indicates port 1, bit 0). A suitable crystal element 402 is coupled to oscillator control input ports X1 and X2 of the microprocessor 400 for providing a master frequency signal in conventional fashion.

The bits 1-6 and 1-7 of port 1 receive signals from respective comparators 404, 406 which function similarly to the comparators 140 and 206 described above with reference to FIG. 6, in generating recognizable signal levels to the microprocessor 400 in response to the data conditions on the data line 18. In this regard, the data line 18 is coupled to the non-inverting inputs of both comparators 404, 406 by way of an RC network comprising a resistor 408 and a capacitor 418. A voltage pullup is also provided by a suitable resistor 410. Suitable reference voltages are provided at the inverting inputs of the respective comparators 404, 406 by way of a voltage divider network comprising resistors 412, 414 and 416.

The clock signal on line 235 is provided from the 1-1 terminal of the microprocessor 400 by way of an operational amplifier 420, a switching transistor 422, and a pair of opposite polarity bipolar transistors 421, 423. Similarly, the enable line 20 (E/R line) is fed from bit 1-0 of the microprocessor 400 by way of an operational amplifier 424 and a switching transistor 426. The audible alarm 24 is fed from bit 0-6 of the microprocessor 400 by way of a first switching transistor 428 and a second switching transistor 430. The sounding of the audible alarm 24 is further controlled by a suitable timing or oscillator circuit comprising an operational amplifier 432 and associated components.

A display panel 434 includes three seven-segment characters and a group of message characters designated generally 436. The display panel 434 preferably comprises a liquid crystal display (LCD) and is driven from a suitable display driver integrated circuit 438, which in the illustrated embodiment comprises a liquid crystal display driver of the type generally designated HLCD0438. This display driver circuit 438 receives a clock signal from the bit 0-4 of the microprocessor 400, a load signal from the bit 0-3 and a serial data input line from the bit 0-5.

Bits 0-0, 0-1, and 0-2 of the microprocessor 400 are coupled to a suitable function selection switch (not shown) for selecting the planter function to be displayed by the messages 436 of the display panel 434. The seven-segment characters display the value of the selected function. In this regard, the RPM rotational speed of a fan which provides the pressurized air in a typical "air seeder" type of grain drill may be directly displayed. Other machine functions may be monitored by providing suitable sensors and interfacing these sensors with the microprocessor 400, which may readily be programmed to respond thereto. When none of these additional functions is selected for display, the number of any planting row or seed tube at which a failure to deliver seeds is detected will be displayed in the seven-segment characters of the display panel 434. If the data on line 18 indicates that one or more of the seed supply hoppers is low, in response to the signals from the associated hopper level sensor 250 (see FIG. 9) and transfer cell 210 (see FIG. 7), an appropriate alarm signal including sounding of audible alarm 24 and a message 436 of display panel 434 will be given. The microprocessor recognizes signals on the data line 18 in accordance with a predetermined sequence of scanning thereof.

Ports 4-0, 4-1, 4-2 and 4-3 of the microprocessor receive a four-bit code from a "rate selection" control switch 437 for selecting a number representing an expected or desired number of seeds to be dispensed from each planting unit over a predetermined time. If the actual number of seeds dispensed falls below this selected number an alarm is given and a failure indication is displayed in the display panel 434. It is a feature of the invention that the microprocessor 400 is adapted to receive and store a plurality of the signals generated on the data line 18 from each of the seed sensor transfer cells of FIG. 10. In this regard, a suitable register or equivalent means (not shown) is provided internally in the microprocessor 400 for storing the signals sensed at each transfer cell over some period of time, and hence over a given number of scans of all of the cells.

In the illustrated embodiment, the microprocessor clocks at a 3.007 kHz rate so as to scan 3060 transfer cells in 1.0176 seconds, and preferably 102 transfer cells in sequence repeated 30 times in 1.0176 seconds. The first of these 102 transfer cells scanned is the hopper level cell of FIG. 7, followed by up to 99 seed sensor cells in sequence (FIG. 10) and the termination cell of FIG. 8. The last clock of the 102 count sequence is used to reset all of the transfer cells by way of the E/R line 20. This sequence is repeated six times to form one monitoring cycle. Hence, 99 storage locations are provided for the data signals received from up to 99 seed sensor transfer cells, each therefore corresponding to one of up to 99 rows of seeds simultaneously planted by the planting machine. Moreover, since these signals are produced for 180 scan sequences, each storage location accommodates at least 180 readings for its associated seed sensor.

With reference to FIG. 10, the 1-bit memory in each of the transfer cells provide a responsive pulse width of on the order of 34 milliseconds each time a seed is detected present by the associated piezoelectric sensing element. However, it is known that different percentages of the seeds actually delivered through a seed tube will strike the piezoelectric element causing this response of the memory. For example, in planting soy beans it is to be expected that from substantially 80 to 90 percent of seeds will strike the piezoelectric element. However, in smaller grains such as wheat, it is known that only from substantially 20 to 30 percent of the seeds delivered through a planting tube will strike the piezoelectric sensor.

Accordingly, the number of "active" memory states stored by the microprocessor 400 for 180 scans of a given transfer cell, and its associated seed planting tube or row, will be on the order of 144 to 162 for soy beans and on the order of 36 to 54 for wheat. Accordingly, the rate selection switch 437 permits the operator to set in a signal to the microprocessor 400 which is interpreted thereby as the appropriate number for the grain being planted. For example, moving the selection switch 437 to a given position will signal the microprocessor that an alarm is to be given for any row in which the register accumulates fewer than 144 counts over 180 scans, and hence is useful in monitoring the planting of soy beans. A different setting of the rate selection switch 437 signals the microprocessor to give an alarm for any row in which the register does not accumulate at least 36 counts per 180 scans, thus providing suitable monitoring for the planting of wheat.

This rate selection switch may have up to 31 such settings, being binary-encoded at the four-bit input 4-0, 4-1, 4-2, 4-3 of the microprocessor 400. An operator's manual may suggest one or more appropriate settings for each grain crop to be planted. Preferably, the operator will select one of the suggested settings, but if an excessive number of alarms are given, the operator may modify the setting downwardly to correspond more closely to the seed dispensing operation experienced when all planting units are observed to be operating properly. An alarm will then be given only when this experienced or "expected" seed dispensing operation is not achieved by any planting unit or units.

Bits 5-0, 5-1 and 5-2 of the microprocessor 400 are programmable inputs for setting in a predetermined factor for calibrating the fan rotation speed or RPM. In this regard, it will be remembered that a fan is conventionally utilized to provide pressurized air in conventional grain drills or planting machines of this type. A suitable RPM sensor (not shown) associated with such a fan preferably comprises an inductive pickup positioned so as to produce an output pulse each time a bolt on the rotating fan passes thereby. Hence, a suitable binary code may be set into these inputs 5-0, 5-1 and 5-2 to indicate the number of bolts on a given fan, thereby providing a reference point from which RPM may be calculated in response to the number of pulses received from the inductive pickup.

Referring also to FIG. 11B, the fan RPM sensor feeds an interrupt terminal (INT) of the microprocessor 400 by way of a suitable circuit including an operational amplifier 440, and a pair of back-to-back diodes 442 for setting a predetermined signal swing or peak-to-peak value to be fed through.

Suitable supply voltages are provided by a power supply circuit 449 including a pair of conventional integrated circuit voltage regulator components 450 and 452. In the illustrated embodiment the voltage regulator 450 is of the type generally designated 7805, and the voltage regulator 452 is of the type generally designated 7806. A suitable power-up, power-down control circuit is provided and includes a pair of operational amplifiers 454 and 456 which receive inputs from the power supply circuit 449. These operational amplifiers feed inputs 4-5 and 4-6 of the microprocessor 400. The power supply receives an input from a suitable source such as a 12 volt tractor battery of a tractor which pulls the seed planting machine, by way of an on-off switch 458.

What has been illustrated and described herein is a novel and improved monitoring system for a grain or seed planting machine. This monitoring system comprises: a seed presence sensing device (piezoelectric sensor 10); a one-bit finite duration memory (one-shot circuit 36); a sequence circuit (circuits 30 and 32, preferably as shown in FIG. 10); a sequence controller (monitoring circuit 22, and preferably, the circuit of FIG. 11); a time integrator (a function of microprocessor 400); and an adjustable reference (switch 437 and a function of microprocessor 400).

Seed presence is detected by the piezoelectric sensor element 10 which in turn feeds the presence information to the memory (one-shot circuit 36) which retains the seed strike information for approximately 34 ms.

The sequence circuit 30, 32 in each transfer cell 14 responds to the negative going edge of a parallel clock signal from the microprocessor 14 and an enable signal from the previous cell (from microprocessor 400, in the case of the first transfer cell). If the previous cell has been scanned, the following cell will transfer the state of the memory onto the common (single) data line 18. When the clock line 235 returns high, the sequencer 30, 32 removes the memory from the data line 18 (by disabling the gate 34) and feeds an enable signal to the next transfer cell. Once scanned, a sequence circuit will not output its memory again until it receives a reset command from the microprocessor 14.

The remaining system components are formed by the microprocessor 400. The microprocessor 400 cycles the parallel clock line at a 3.007 kHz rate which allows 3060 cell scans in 1.0176 seconds or 102 cell scans 30 times each in 1.0176 seconds. Of the 102 scan cycles, 99 are active seed monitoring cells; one is used for hopper levels; one for end of line detect; and the last to reset. Since $1.0176/30 \approx 34$ ms, the time interval between interrogation of a given sensor memory is established.

In one second each sensor memory has been examined 30 times and the memory state has been added to its respective integrator register plus an RPM (fan speed) input has been scanned and its data has been logged in its summing location. At the end of the 1.076 second cycle the microprocessor 400 takes a short "time out" to update visual and audible (i.e., display) outputs. A second line scan is then restarted after syncing to the master crystal oscillator 402.

This sequence is repeated six times for a total of 180 examinations of each sensor. At this point (6+ seconds) "time out" is again taken to fetch each integrator value and compare it against the operation selected adjustable reference number. If the integrator value falls below the reference, that location is noted as a row fail for output display in the ensuing seconds.

The feature of counting (integrating) the sensor (memory) states over time gives the system the ability to monitor machines seeding different grains at different seed populations. Moreover, this feature accommodates the generally random seed strike nature.

Figure 12:
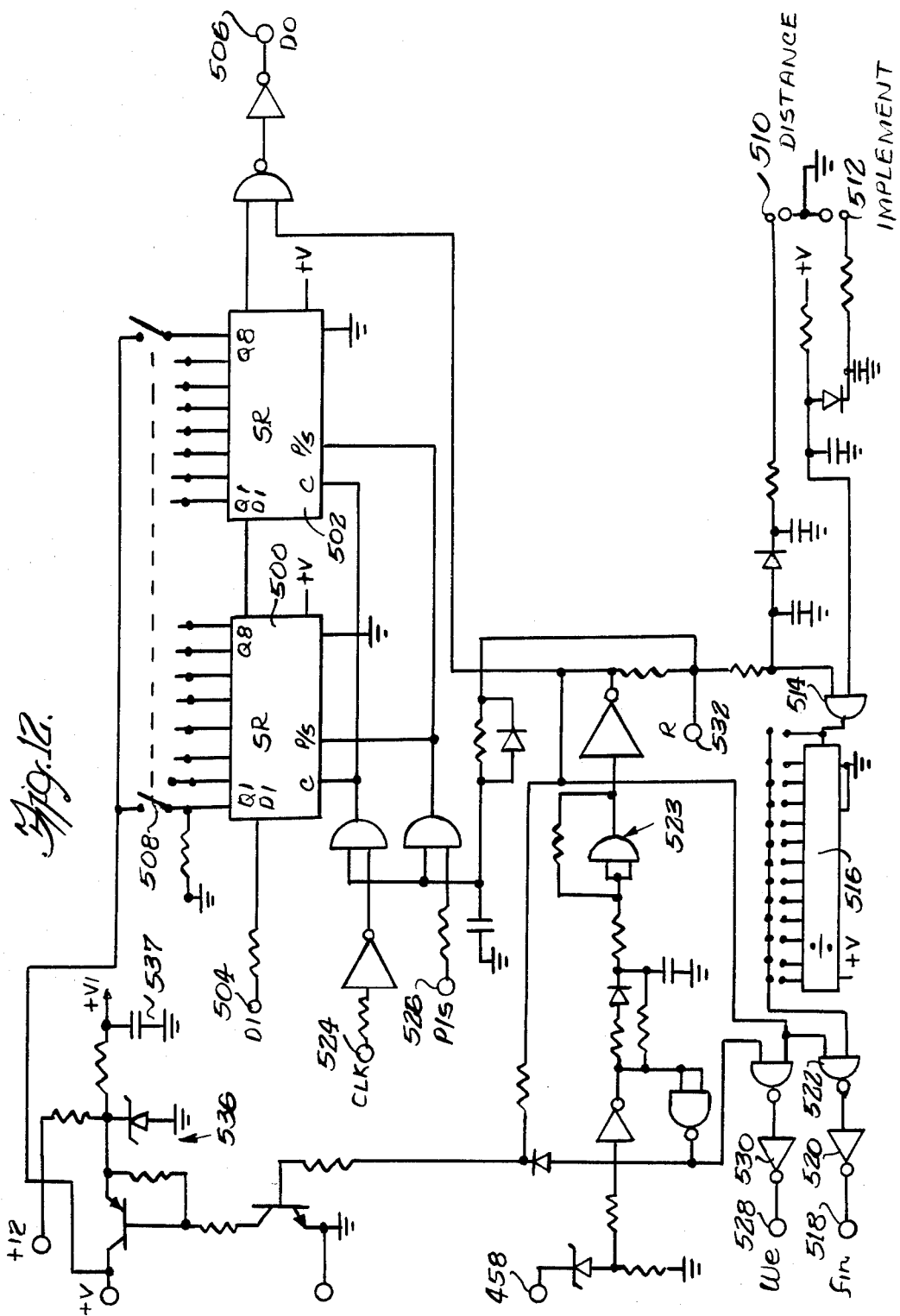
FIG. 12 is a schematic circuit diagram of an area monitor circuit useful with the circuit of FIGS. 11A and 11B.

Referring now to FIG. 12, in accordance with one practical and preferred embodiment of the invention, a novel area counter module is also provided for cooperating with the microprocessor 400 of FIG. 11. Advantageously, the circuit of FIG. 12 is arranged to retain, independently of the microprocessor 400, the cumulative count of area or acreage covered a given implement such as a grain drill.

In this regard, a 16-bit memory is provided in the form of a pair of 8-bit shift registers 500, 502 which in the illustrated embodiment comprise 8-stage static shift registers of the type generally designated CD4021. These shift registers are tied together for serial exchange of data with the microprocessor 400 by way of data in (DI) and data out (DO) terminals 504 and 506. Additionally, parallel input lines, designated generally 508 are arranged for carrying a 16-bit code for indicating to the microprocessor or microcomputer 400 a predetermined constant M for use in calculating area covered by the implement, as will be described hereinbelow. In the illustrated embodiment a plurality of switches are provided on the parallel inputs to the shift registers 500–502 for selectively establishing a binary code (by closing selected switches to the positive voltage supply). Other suitable means may be utilized for producing logic levels at the respective parallel inputs to represent a desired binary encoded constant or factor M.

A distance input terminal 510 and implement status input terminal 512 feed respective inputs of a two-input AND gate 514 by way of suitable intervening signal shaping networks. Briefly, the distance input 510 receives pulses from a suitable distance or ground speed sensor (not shown) which may be any of a number of types known in the arts. Essentially, this distance input 510 receives a known number of pulses per given increment of distance traveled by the implement being monitored. The implement status inputs 512 is arranged to receive a signal indicating whether an implement is in a working or "down" condition, during which area covered is to be counted or in a transport or "up" position, in which case distance or area traveled is not to be counted. Hence the implement status input 512 serves to enable or disable the gate 514 in this regard.

The output of the gate 514 feeds a 12-stage divider 516, which in the illustrated embodiment comprises a 12-stage ripple-carry binary counter/divider of the type generally designated CD4040. This divider 516 has sixteen binary output terminals, one of which is chosen as the output. This choice operates to scale the distance pulses, by dividing by a number N as explained below. Hence one pulse is produced at the selected output of the divider 516 for every N pulses received at the input thereof. This scaled output is fed to the microprocessor at a frequency input ($f_{in}$) 518 by way of a suitable buffer 520. This buffer 520 is fed from the output of a two-input NAND gate 522 which receives one of its inputs from the selected binary output of the divider 516. The other input of the gate 522 is enabled from a suitable logic network or circuit 523 for controlling the sequence of operation in selecting and monitoring the frequency input 518, as will be described later.

The circuit of FIG. 12 also receives suitable control signals from the microcomputer 400 by way of a clock line 524 (not to be confused with the clock line 235 previously discussed) and a parallel/serial (P/S) control line 526, both of which feed corresponding clock and parallel/serial select inputs of the respective shift registers 500, 502 by way of suitable intervening logic. Additionally, a write enable line (We) 528 feeds a suitable write enable signal to the microcomputer 400 for enabling or disabling writing from the microcomputer 400 into the shift registers 500, 502 by way of the data input (DI) line 504. This latter write enable line 528 is fed from a suitable buffer 530 by way of the logic network 523 previously mentioned. This logic network 523 also feeds a reset terminal (R) 532 to the microcomputer 400. Briefly, this logic network 523 is responsive to the on-/off switch 458 for disabling the writing of area or acreage data from the microcomputer 400 into the registers 500, 502 when the power to the console is switched off. This prevents loss of the accumulated, stored area data in the registers 500, 502 in the absence of updated or replacement data from the microcomputer 400 due to power shut off to the console.

Advantageously, the memory capability provided by the 16-bit shift register comprising registers 500, 502 is retained with but minimum power drain on the vehicle battery or other power source even during prolonged periods of non-use of the console and/or vehicle when the main power switch 458 is turned off. In this regard, a suitable voltage regulation network designated generally by the reference numeral 536 is coupled to the positive and ground terminals of a vehicle battery for providing a +5 volt supply, in the illustrated embodiment, to the shift registers 500, 502 at all times. This circuit 536 also advantageously coordinates this 5 volt supply with the 5 volt supply regulation provided by the circuits 449 of FIG. 11 when the on/off switch 458 is actuated to its on position.

It will be recognized in this regard that the power requirements of the two shift register circuits 500, 502, which in the illustrated embodiment are CMOS circuits, is on the order of several microwatts, whereas the power requirement for a microcomputer such as the microcomputer 400 of FIG. 11 for similarly retaining its memory after power shutdown is on the order of several milliwatts. Hence, battery drain of the vehicle is held to a negligible level by the provision of the circuit of FIG. 12 for retaining cumulative area or acreage memory. Additionally, the retention of volatile memory (e.g., RAM) in a microcomputer or microprocessor such as the microcomputer 400 requires relatively complex and expensive power-up and power-down control circuits for preventing any changes in the volatile memory components during power-up and power-down cycling. This additional circuitry is eliminated by provision of the relatively simple and inexpensive circuit of FIG. 12.

Advantageously, the circuit of FIG. 12 also may be characterized as a "generic" area counter and memory counter module, readily usable with any system employing a microprocessor or microcomputer which is programmed with suitable subroutines for interacting with the circuit of FIG. 12. In this regard, the presence or absence of the circuit of FIG. 12 may be readily detected by conventional means to respectively enable or disable execution of the associated subroutines for area monitoring and accumulation. Hence, the circuit of FIG. 12 may readily be advantageous provided as a simple "add-on" circuit card to any system whose microprocessor or microcomputer is programmed with suitable subroutines. This circuit of FIG. 12 thus provides monitoring of total acreage or area covered by any sort of farm implement which is provided with suitable distance or ground speed and implement status sensors to feed the inputs 510, 512 thereof. In this regard, as will be seen presently, selection of the constant M, as set in at the parallel inputs of the shift registers 500, 502 and the number N as set by selection of one of the parallel binary outputs of the divider 516 automatically accommodates the circuit of FIG. 12 and the microcomputer 400. These numbers M and N enable accurate monitoring of the area covered by an implement having a given known width and equipped with a distance sensor which provides a known number of pulses per unit of distance traveled.

In operation, the distance input 510 is initially scaled at the divider 516 to define a scale number N such that one pulse is given at its output for each N pulses received at the distance input 510. This number is selected to take into account capacity of the microcomputer 400, which in the illustrated embodiment is capable of scanning the frequency input ($f_{in}$) 518 substantially once per second. Hence, the maximum frequency rate permissible at this output 518 is substantially ½ Hz. Accordingly, a binary output terminal n of the divider 516 is chosen such that:

$$N = 2^n \leq 0.0075WX \text{ in English units; or}$$

$$N = 2^n \leq 0.01WX \text{ in Metric units;}$$

where n is the binary output selected of the divider 516, W is the width of the implement whose area coverage is to be monitored, and X is the number of pulses produced by the distance sensor per 0.1 units of area covered at the given width W. The microcomputer 400 is then programmed by initially reading out the parallel data set in on the lines 508 of the shift registers 500, 502 for reconverting each pulse or given number of pulses N into units of area by application of a constant M, where $$M = 32768N/X.$$

This constant M will be read into the microcomputer each time power is initiated by actuation of the on/off switch 458. At the same time the microcomputer RAM, which in the illustrated embodiment has a 32-bit configuration, reads in the area or acreage currently accumulated in the register 500, 502 as a starting point for accumulating further acreage or area. The 32-bit memory of the microprocessor 400 is preferably arranged to accumulate area in such a fashion that the sixteen lower order bits accumulate any fractional units of the constant M while the higher order order sixteen bits accumulate units of M. In this regard, the constant M given above is equivalent to 1/10 of a unit of area, whether in acres (English system) or hectares (Metric system). Hence, only increments of at least 1/10 of an unit area will be added to the registers 500, 502, thus further reducing demands on computer time in this regard. The microcomputer 400 will therefore write in new cumulative totals to the registers 500, 502 upon accumulation of M units or some multiple of some M units, as time is permitted for the write procedure in the monitoring process. Accordingly, the accumulated area stored in the shift registers 500, 502 is periodically updated in this fashion.

When the microcomputer 400 is powered-up the onboard RAM reads out the total stored in the registers 500, 502 and increments this total in accordance with the pulses received on the $f_{in}$ terminal 518, periodically updating the data in the outboard memory registers 500, 502. When the power switch 458 is switched off, the most recent updated cumulative area total is therefore retained in the outboard memory registers 500, 502, although some fractional area count (less than 1/10 unit of area) may be lost in the power-off cycle. Advantageously, the CMOS registers 500, 502 and relatively large capacitor 537 provided in the power supply circuit 536 therefor, will function to retain the memory data even in the event of disconnection thereof from the battery for on the order of several minutes, thus adding substantially to the reliability of the memory provided thereby. In this regard, it will be recognized that the circuit arrangement of FIG. 12 may be utilized as an outboard memory for any data which is to be retained and/or periodically updated in similar fashion.

In order to fully describe a specific embodiment of the invention, an exemplary program for the microprocessor 400 of FIG. 11 is reproduced on the following pages.

```
ERRS  LOC  OBJECT  ADDR LINE           SOURCE STATEMENT

0001  *################################################
               0002  *
               0003  *   PRASCO AIR SEEDER MONITOR  8 SEPT 81  DICKEY-JOHN/JAK
               0004  *
               0005  *################################################
               0006  *
               0007  *      ADDED ACRES 6/24/81   -
               0008  *      ACRE MODE CHANGED TO SCAN SENSORS 8-12-81
               0009  *
     0000 0010 BEG    ORG    0
     0FC0 0011 URAH   EQU    H'FC0'
```

```
0000 1A         0012        DI
0001 70         0013        CLR
0002 B0         0014        OUTS  0
0003 B5         0015        OUTS  5
0004 B6         0016        OUTS  6
0005 B7         0017        OUTS  7
0006 51         0018        LR    1,A
0007 74         0019        LIS   4
0008 B1         0020        OUTS  1       SERIAL SELECT.
0009 208C       0021        LI    H'8C'   DISPLAY TEST.
000B 52         0022        LR    2,A
000C 2050       0023   T1   LI    H'50'   ALARM ON+DSP CLK LO+DSP DATA ON+DSP LOAD.
000E B0         0024        OUTS  0
000F 2040       0025        LI    H'40'   DSP CLK HI.
0011 B0         0026        OUTS  0
0012 31         0027        DS    1
0013 94F8  000C 0028        BNZ   T1
0015 32         0029        DS    2
0016 94F5  000C 0030        BNZ   T1
0018 62         0031        LISU  2       CLEAR ACRE REGISTERS.
0019 6B         0032        LISL  3
001A 2906CB 06CB 0033       JMP   H'6CB'
                 0034       ORG   H'6CB'
06CB 70         0035        CLR
06CC 5E         0036        LR    D,A
06CD 8FFE  06CC 0037        BR7   *-1
06CF 61         0038        LISU  1
06D0 5E         0039        LR    D,A
06D1 8FFE  06D0 0040        BR7   *-1
06D3 2A0000 0000 0041  CKSM DCI   0       PGM CKSM.
06D6 78         0042        LIS   8
06D7 52         0043        LR    2,A
06D8 20FF       0044        LI    H'FF'
06DA 51         0045        LR    1,A
06DB 70         0046        CLR
06DC 88         0047        AM
06DD 31         0048        DS    1
06DE 94FD  06DC 0049        BNZ   *-2
06E0 32         0050        DS    2
06E1 94FA  06DC 0051        BNZ   *-5
06E3 18         0052        COM
06E4 1F         0053        INC
06E5 88         0054        AM
06E6 8403  06EA 0055        BZ    STRT
06E8 90EA  06D3 0056        BR    CKSM
                 0057  *
                 0058  * RETRIEVE ACRES AND SCALE FROM REGISTERS.
                 0059  *
06EA 67         0060   STRT LISU  7
06EB 6F         0061        LISL  7
06EC A1         0062        INS   1
06ED 15         0063        SL    4
06EE 8103  06F2 0064        BP    *+4     BR IF DYING.
06F0 29078E 078E 0065       JMP   NOACR
                 0066  *
```

```
              0067 *  INPUT ACRES   216 MICROSECS
              0068 *
06F3 A0       0069       INS   0
06F4 B4       0070       OUTS  4
06F5 5E       0071       LR    D,A      1
06F6 A0       0072       INS   0
06F7 B4       0073       OUTS  4
06F8 5E       0074       LR    D,A      2
06F9 A0       0075       INS   0
06FA B4       0076       OUTS  4
06FB 5E       0077       LR    D,A      3
06FC A0       0078       INS   0
06FD B4       0079       OUTS  4
06FE 5E       0080       LR    D,A      4
06FF A0       0081       INS   0
0700 B4       0082       OUTS  4
0701 5E       0083       LR    D,A      5
0702 A0       0084       INS   0
0703 B4       0085       OUTS  4
0704 5E       0086       LR    D,A      6
0705 A0       0087       INS   0
0706 B4       0088       OUTS  4
0707 5E       0089       LR    D,A      7
0708 A0       0090       INS   0
0709 B4       0091       OUTS  4
070A 5E       0092       LR    D,A      8
              0093 *
070B 66       0094       LISU  6
070C A0       0095       INS   0
070D B4       0096       OUTS  4
070E 5E       0097       LR    D,A      9
070F A0       0098       INS   0
0710 B4       0099       OUTS  4
0711 5E       0100       LR    D,A     10
0712 A0       0101       INS   0
0713 B4       0102       OUTS  4
0714 5E       0103       LR    D,A     11
0715 A0       0104       INS   0
0716 B4       0105       OUTS  4
0717 5E       0106       LR    D,A     12
0718 A0       0107       INS   0
0719 B4       0108       OUTS  4
071A 5E       0109       LR    D,A     13
071B A0       0110       INS   0
071C B4       0111       OUTS  4
071D 5E       0112       LR    D,A     14
071E A0       0113       INS   0
071F B4       0114       OUTS  4
0720 5E       0115       LR    D,A     15
0721 A0       0116       INS   0
0722 5E       0117       LR    D,A     16
              0118 *
              0119 *  PARALLEL LOAD  12 MICROSECS
              0120 *
0723 70       0121       CLR
0724 B1       0122       OUTS  1
```

| | | | | |
|---|---|---|---|---|
| 0725 74 | 0123 | LIS | 4 | |
| 0726 B1 | 0124 | OUTS | 1 | |
| | 0125 | * | | |
| | 0126 | * INPUT CONSTANT | 220 MICROSECS. | |
| | 0127 | * | | |
| 0727 65 | 0128 | LISU | 5 | |
| 0728 A0 | 0129 | INS | 0 | |
| 0729 B4 | 0130 | OUTS | 4 | |
| 072A 5E | 0131 | LR | D,A | 1 |
| 072B A0 | 0132 | INS | 0 | |
| 072C B4 | 0133 | OUTS | 4 | |
| 072D 5E | 0134 | LR | D,A | 2 |
| 072E A0 | 0135 | INS | 0 | |
| 072F B4 | 0136 | OUTS | 4 | |
| 0730 5E | 0137 | LR | D,A | 3 |
| 0731 A0 | 0138 | INS | 0 | |
| 0732 B4 | 0139 | OUTS | 4 | |
| 0733 5E | 0140 | LR | D,A | 4 |
| 0734 A0 | 0141 | INS | 0 | |
| 0735 B4 | 0142 | OUTS | 4 | |
| 0736 5E | 0143 | LR | D,A | 5 |
| 0737 A0 | 0144 | INS | 0 | |
| 0738 B4 | 0145 | OUTS | 4 | |
| 0739 5E | 0146 | LR | D,A | 6 |
| 073A A0 | 0147 | INS | 0 | |
| 073B B4 | 0148 | OUTS | 4 | |
| 073C 5E | 0149 | LR | D,A | 7 |
| 073D A0 | 0150 | INS | 0 | |
| 073E B4 | 0151 | OUTS | 4 | |
| 073F 5E | 0152 | LR | D,A | 8 |
| | 0153 | * | | |
| 0740 64 | 0154 | LISU | 4 | |
| 0741 A0 | 0155 | INS | 0 | |
| 0742 B4 | 0156 | OUTS | 4 | |
| 0743 5E | 0157 | LR | D,A | 9 |
| 0744 A0 | 0158 | INS | 0 | |
| 0745 B4 | 0159 | OUTS | 4 | |
| 0746 5E | 0160 | LR | D,A | 10 |
| 0747 A0 | 0161 | INS | 0 | |
| 0748 B4 | 0162 | OUTS | 4 | |
| 0749 5E | 0163 | LR | D,A | 11 |
| 074A A0 | 0164 | INS | 0 | |
| 074B B4 | 0165 | OUTS | 4 | |
| 074C 5E | 0166 | LR | D,A | 12 |
| 074D A0 | 0167 | INS | 0 | |
| 074E B4 | 0168 | OUTS | 4 | |
| 074F 5E | 0169 | LR | D,A | 13 |
| 0750 A0 | 0170 | INS | 0 | |
| 0751 B4 | 0171 | OUTS | 4 | |
| 0752 5E | 0172 | LR | D,A | 14 |
| 0753 A0 | 0173 | INS | 0 | |
| 0754 B4 | 0174 | OUTS | 4 | |
| 0755 5E | 0175 | LR | D,A | 15 |
| 0756 A0 | 0176 | INS | 0 | |
| 0757 5E | 0177 | LR | D,A | 16 |

```
                    0178  *
                    0179  *  OUTPUT ACRES   164 MICROSECS
                    0180  *
0758 67             0181           LISU  7
0759 4E             0182           LR    A,D
075A B4             0183           OUTS  4        1
075B 4E             0184           LR    A,D
075C B4             0185           OUTS  4        2
075D 4E             0186           LR    A,D
075E B4             0187           OUTS  4        3
075F 4E             0188           LR    A,D
0760 B4             0189           OUTS  4        4
0761 4E             0190           LR    A,D
0762 B4             0191           OUTS  4        5
0763 4E             0192           LR    A,D
0764 B4             0193           OUTS  4        6
0765 4E             0194           LR    A,D
0766 B4             0195           OUTS  4        7
0767 4E             0196           LR    A,D
0768 B4             0197           OUTS  4        8
                    0198  *
0769 66             0199           LISU  6
076A 4E             0200           LR    A,D
076B B4             0201           OUTS  4        9
076C 4E             0202           LR    A,D
076D B4             0203           OUTS  4        10
076E 4E             0204           LR    A,D
076F B4             0205           OUTS  4        11
0770 4E             0206           LR    A,D
0771 B4             0207           OUTS  4        12
0772 4E             0208           LR    A,D
0773 B4             0209           OUTS  4        13
0774 4E             0210           LR    A,D
0775 B4             0211           OUTS  4        14
0776 4E             0212           LR    A,D
0777 B4             0213           OUTS  4        15
0778 4E             0214           LR    A,D
0779 2180           0215           NI    H'80'    CLR ALL OTHER BITS OF P4.
077B B4             0216           OUTS  4        16
                    0217  *
                    0218  *  CRUNCH ACRES
                    0219  *
077C 67             0220           LISU  7
077D 280634 0634    0221           PI    DCRU     GOTO DATA CRUNCH.
0780 62             0222           LISU  2
0781 6B             0223           LISL  3
0782 43             0224           LR    A,3
0783 5E             0225           LR    D,A
0784 42             0226           LR    A,2
0785 5C             0227           LR    S,A
                    0228  *
                    0229  *  CRUNCH CONSTANT
                    0230  *
0786 65             0231           LISU  5
0787 280634 0634    0232           PI    DCRU
```

```
078A 43           0233           LR    A,3
078B 07           0234           LR    QL,A
078C 42           0235           LR    A,2
078D 06           0236           LR    QU,A
                  0237  *
                  0238  *
                  0239  *
078E 2021         0240  NOACR    LI    33         DISPLAY OFF IF CKSM OK.
0790 51           0241           LR    1,A
0791 2078         0242  T2       LI    H'78'      DATA OFF+CLK LO+LOAD LO.
0793 B0           0243           OUTS  0
0794 2068         0244           LI    H'68'      CLK HI.
0796 B0           0245           OUTS  0
0797 31           0246           DS    1
0798 94F8  0791   0247           BNZ   T2
079A 70           0248           CLR
079B B0           0249           OUTS  0          LOAD DSP.
079C 78           0250           LIS   8
079D B0           0251           OUTS  0
                  0252  *
                  0253  * RESTART
                  0254  *
079E 1A           0255  TST      DI
079F 2080         0256           LI    H'80'
07A1 FA           0257           NS    10
07A2 9403  07A6   0258           BNZ   TST1       BR IF CNT FLAG SET.
07A4 78           0259           LIS   8          ALARM OFF.
07A5 B0           0260           OUTS  0
07A6 76           0261  TST1     LIS   6          ENABLE LO.
07A7 B1           0262           OUTS  1          CLK HI.
07A8 2085         0263           LI    133        MODULO-N.
07AA B7           0264           OUTS  7
07AB 70           0265           CLR
07AC B5           0266           OUTS  5          CLR PORT FLAGS.
07AD 2A0FC0 0FC0  0267           DCI   URAM
07B0 2040         0268           LI    64
07B2 50           0269           LR    0,A
07B3 70           0270           CLR
07B4 17           0271           ST
07B5 30           0272           DS    0          CLR RAM.
07B6 94FD  07B4   0273           BNZ   *-2
07B8 4B           0274           LR    A,11
07B9 2110         0275           NI    H'10'
07BB 52           0276           LR    2,A        SAVE 'FIRST ERR' FLAG.
07BC 202C         0277           LI    44         CLR POP REGS.
07BE 51           0278           LR    1,A
07BF 203F         0279           LI    0'77'
07C1 50           0280           LR    0,A
07C2 40           0281           LR    A,0
07C3 0B           0282           LR    IS,A
07C4 70           0283           CLR
07C5 5C           0284           LR    S,A
07C6 30           0285           DS    0
07C7 31           0286           DS    1
07C8 94F9  07C2   0287           BNZ   *-6
```

```
07CA 7B           0288        LIS    11
07CB 51           0289        LR     1,A
07CC 7D           0290        LIS    O'15'
07CD 50           0291        LR     0,A
07CE 40           0292        LR     A,0
07CF 0B           0293        LR     IS,A
07D0 70           0294        CLR
07D1 5C           0295        LR     S,A
07D2 30           0296        DS     0
07D3 31           0297        DS     1
07D4 94F9  07CE  0298        BNZ    *-6
07D6 42           0299        LR     A,2
07D7 5B           0300        LR     11,A    RESTORE 'FIRST ERR' FLAG.
                  0301    *
07D8 A0           0302        INS    0       INIT MODE.
07D9 2107         0303        NI     7
07DB 50           0304        LR     0,A
07DC 2010         0305        LI     H'10'
07DE FB           0306        NS     11              SAVE 'FIRST ERR' FLAG
07DF E0           0307        XS     0               AND MODE.
07E0 5B           0308        LR     11,A
07E1 2080         0309        LI     H'80'   SET TEST FLAG.
07E3 5A           0310        LR     10,A
07E4 62           0311        LISU   2       INIT FAIL TBL PNTR.
07E5 6E           0312        LISL   6
07E6 201C         0313        LI     O'34'
07E8 5C           0314        LR     S,A
07E9 71           0315        LIS    1       INIT 104 CNTR.
07EA 58           0316        LR     8,A
07EB 204B         0317        LI     H'4B'   EXTERNAL INT ON.
07ED B6           0318        OUTS   6       INTERRUPT TIMER ON.
07EE 1B           0319        EI
07EF 90FE  07EE  0320        BR     *-1
                  0321    *
                  0322    *   TIMER INTERRUPT SERVICE ROUTINE *******************
                  0323    *
                  0324        ORG    H'20'
0020 72           0325        LIS    2
0021 FA           0326        NS     10
0022 8408  002B  0327        BZ     INT1    BR IF NOT WAIT STATE.
0024 20FD         0328        LI     H'FD'
0026 FA           0329        NS     10
0027 5A           0330        LR     10,A
0028 1B           0331        EI
0029 90FE  0028  0332        BR     *-1
                  0333    *
002B A1           0334  INT1  INS    1
002C 2101         0335        NI     1
002E 2204         0336        OI     4
0030 B1           0337        OUTS   1       CLK LO.
0031 71           0338        LIS    1       INC 104 CNTR.
0032 C8           0339        AS     8
0033 58           0340        LR     8,A
0034 2568         0341        CI     104
0036 9441  0078  0342        BNZ    INT2    BR IF NOT 104 CNTS.
```

```
0038 71              0343         LIS   1        SET 104 CNTR TO 1.
0039 58              0344         LR    8,A
003A 20FE            0345         LI    H'FE'    CLR TERM FLAG.
003C FA              0346         NS    10
003D 5A              0347         LR    10,A
003E A1              0348         INS   1
003F 2101            0349         NI    1
0041 8412   0054     0350         BZ    ACT      BR IF RESET LO.
0043 77              0351         LIS   7
0044 FB              0352         NS    11
0045 2506            0353         CI    6
0047 8409   0051     0354         BZ    NACT     BR IF 'ON' MODE.
0049 2504            0355         CI    4
004B 8405   0051     0356         BZ    NACT     BR IF 'SILENT'.
004D 2501            0357         CI    1
004F 9404   0054     0358         BNZ   ACT      BR IF NOT 'ACRES'.
0051 290113 0113     0359  NACT   JMP   ERR
0054 00              0360  ACT    LR    A,KU     INC PART-OF-SEC CNTR.
0055 1F              0361         INC
0056 04              0362         LR    KU,A
0057 250F            0363         CI    15
0059 9414   006E     0364         BNZ   N15      BR IF CNTR NOT 15.
005B 2040            0365         LI    H'40'
005D FA              0366         NS    10
005E 8403   0062     0367         BZ    OKAL     BR IF NOT KILLING ALARM.
0060 78              0368         LIS   8        ALARM OFF.
0061 B0              0369         OUTS  0
0062 A0              0370  OKAL   INS   0        INPUT MODE.
0063 2107            0371         NI    7
0065 57              0372         LR    7,A
0066 77              0373         LIS   7
0067 FB              0374         NS    11
0068 E7              0375         XS    7
0069 840D   0077     0376         BZ    NOCH     BR IF NO CHANGE.
006B 29079E 079E     0377         JMP   TST      JMP TO RESTART IF NEW MODE.
006E 251E            0378  N15    CI    30
0070 9406   0077     0379         BNZ   NOCH     BR IF NOT 30 SCAN CNTS.
0072 70              0380         CLR            CLR SCAN CNTR.
0073 04              0381         LR    KU,A
0074 290162 0162     0382         JMP   ONES     GOTO ONE SEC.
0077 1C              0383  NOCH   POP
                     0384  *
0078 77              0385  INT2   LIS   7
0079 FB              0386         NS    11
007A 2506            0387         CI    6
007C 8409   0086     0388         BZ    INT5     BR IF 'ON'.
007E 2504            0389         CI    4
0080 8405   0086     0390         BZ    INT5     BR IF 'SILENT'.
0082 2501            0391         CI    1
0084 94F2   0077     0392         BNZ   NOCH     BR IF NOT 'ACRES'.
0086 71              0393  INT5   LIS   1
0087 FA              0394         NS    10
0088 94EE   0077     0395         BNZ   NOCH     BR IF TERM FLAG SET.
008A 48              0396         LR    A,8
008B 2502            0397         CI    2
```

```
008D 9404   0092 0398        BNZ   NCK2    BR IF CNTR NOT 2.
008F 77          0399        LIS   7       CLK HI.
0090 B1          0400        OUTS  1       RESET HI
0091 1C          0401        POP
0092 2503        0402 NCK2   CI    3
0094 942E   00C3 0403        BNZ   NCK3    BR IF CNTR NOT 3.
0096 75          0404        LIS   5
0097 24FF        0405        AI    -1      DELAY 60 MICROSECONDS.
0099 94FD   0097 0406        BNZ   $-2
009B 900D   00A9 0407        BR    RERE    BR TO ALLOW SPACE FOR EXT INT.
                 0408   *
                 0409   *    EXTERNAL INTERRUPT.
                 0410   *
                 0411        ORG   H'A0'
00A0 62          0412        LISU  2
00A1 6C          0413        LISL  4
00A2 71          0414        LIS   1
00A3 CC          0415        AS    S
00A4 5D          0416        LR    I,A
00A5 4C          0417        LR    A,S
00A6 19          0418        LNK
00A7 5C          0419        LR    S,A
00A8 1C          0420        POP
                 0421   *
                 0422   *
                 0423   *
00A9 A1          0424 RERE   INS   1       READ HOPPER.
00AA 21C0        0425        NI    H'C0'
00AC 57          0426        LR    7,A
00AD A1          0427        INS   1       REREAD HOPPER.
00AE 21C0        0428        NI    H'C0'
00B0 E7          0429        XS    7
00B1 94F7   00A9 0430        BNZ   RERE    BR IF NOT MATCHING READS.
                 0431   *    FIX FLOATING ENABLE LINE PROBLEM
00B3 70          0432        CLR
00B4 C7          0433        AS    7
00B5 919B   0051 0434        BM    NACT    BR TO ERROR IF TERM ON.
00B7 13          0435        SL    1
00B8 12          0436        SR    1
                 0437   *
00B9 14          0438        SR    4
00BA 13          0439        SL    1
00BB 57          0440        LR    7,A
00BC 20F7        0441        LI    H'F7'   STORE HOPPER DATA AS FLAG.
00BE FA          0442        NS    10
00BF E7          0443        XS    7
00C0 5A          0444        LR    10,A
00C1 902E   00F0 0445        BR    CNT2
                 0446   *
                 0447   *    READ SENSOR DATA AND TERM STATUS.
                 0448   *
00C3 A1          0449 NCK3   INS   1
00C4 21C0        0450        NI    H'C0'
00C6 912C   00F3 0451        BM    TERM    BR IF TERMINATION FOUND.
00C8 74          0452        LIS   4
00C9 24FF        0453        AI    -1      DELAY 48 MICROSECONDS.
```

```
00CB 94FD   00C9 0454         BNZ    *-2
00CD A1          0455         INS    1
00CE 21C0        0456         NI     H'C0'
00D0 18          0457         COM
00D1 13          0458         SL     1
00D2 12          0459         SR     1
00D3 14          0460         SR     4
00D4 12          0461         SR     1
00D5 12          0462         SR     1        MOVE DATA TO LSB POSITION.
00D6 57          0463         LR     7,A
00D7 48          0464         LR     A,8
00D8 2543        0465         CI     67
00DA 910F   00EA 0466         BM     ISR      BR IF CURRENT POP IS IN SXP
00DC 2A0FBC 0FBC 0467         DCI    URAM-4
00DF 8E          0468         ADC
00E0 47          0469         LR     A,7
00E1 88          0470         AM
00E2 57          0471         LR     7,A
00E3 20FF        0472         LI     -1
00E5 8E          0473         ADC
00E6 47          0474         LR     A,7
00E7 17          0475         ST
00E8 9007   00F0 0476         BR     CNT2
00EA 24D9        0477  ISR    AI     -39      ADD 0'35', SUBTRACT 67.
00EC 0B          0478         LR     IS,A
00ED 47          0479         LR     A,7      ADD DATA TO CURRENT FOP IN
00EE CC          0480         AS     S
00EF 5C          0481         LR     S,A
                 0482   *
00F0 77          0483  CNT2   LIS    7
00F1 B1          0484         OUTS   1        CLK HI.
00F2 1C          0485         POP
                 0486   *
                 0487   * HERE IF LINE TERMINATION FOUND.
                 0488   *
00F3 76          0489  TERM   LIS    6        CLK HI.
00F4 B1          0490         OUTS   1        RESET LO.
00F5 4A          0491         LR     A,10     SET TERM FLAG.
00F6 2201        0492         OI     1
00F8 5A          0493         LR     10,A
00F9 62          0494         LISU   2
00FA 6F          0495         LISL   7
00FB 70          0496         CLR
00FC CA          0497         AS     10
00FD 810C   010A 0498         BP     NTST     BR IF NOT CNT SCAN.
00FF 48          0499         LR     A,8
0100 24FC        0500         AI     -4       *********
0102 5C          0501         LR     S,A
0103 207F        0502         LI     H'7F'
0105 FA          0503         NS     10
0106 5A          0504         LR     10,A     CLR CNT SCAN FLAG.
0107 1B          0505         EI
0108 90FE   0107 0506         BR     *-1
010A 48          0507  NTST   LR     A,8
010B 24FC        0508         AI     -4       *********
```

```
010D 18              0509           COM
010E 1F              0510           INC
010F CC              0511           AS    S
0110 9402   0113     0512           BNZ   ERR        BR IF SENSOR CNT FAIL.
0112 1C              0513           POP
                     0514   *
                     0515   * HERE IF SENSOR CNT HAS CHANGED FROM FIRST SCAN.
                     0516   *
0113 1A              0517   ERR     DI
0114 2010            0518           LI    H'10'
0116 FB              0519           NS    11
0117 841F   0137     0520           BZ    ER1        BR IF FIRST ERR.
0119 2048            0521           LI    H'48'
011B B0              0522           OUTS  0          ALARM ON.
011C 2014            0523           LI    H'14'
011E 53              0524           LR    3,A        LOAD 'TEST FAILED' MESSAGE.
011F 2074            0525           LI    H'74'
0121 54              0526           LR    4,A        LOAD 'F'.
0122 2023            0527           LI    H'23'
0124 55              0528           LR    5,A        LOAD 'L'.
0125 2066            0529           LI    H'66'
0127 56              0530           LR    6,A        LOAD 'C'.
0128 280325 0325     0531           PI    DSP
012B 20BF            0532   ER2     LI    H'BF'
012D FA              0533           NS    10
012E 2280            0534           OI    H'80'      SET SENSOR CNT FLAG.
0130 5A              0535           LR    10,A       CLR ALARM OFF FLAG.
0131 230142 0142     0536           PI    INSR
0134 29079E 079E     0537           JMP   TST
0137 4B              0538   ER1     LR    A,11       SET 'FIRST ERR' FLAG.
0138 2210            0539           OI    H'10'
013A 5B              0540           LR    11,A
013B 4A              0541           LR    A,10
013C 2280            0542           OI    H'80'
013E 5A              0543           LR    10,A
013F 29079E 079E     0544           JMP   TST        GOTO RESTART.
                     0545   *
                     0546   * CHECK FOR SHORT CIRCUITS OF 6V & 12V LINES.
                     0547   *
0142 A4              0548   INSR    INS   4          INPUT SHORT CIR INDICATORS.
0143 2160            0549           NI    H'60'
0145 57              0550           LR    7,A
0146 A4              0551           INS   4
0147 2160            0552           NI    H'60'
0149 E7              0553           XS    7
014A 94F7   0142     0554           BNZ   INSR
014C 78              0555           LIS   8          DELAY.
014D 24FF            0556           AI    -1
014F 94FD   014D     0557           BNZ   *-2
0151 A4              0558           INS   4
0152 2160            0559           NI    H'60'
0154 E7              0560           XS    7
0155 94EC   0142     0561           BNZ   INSR
0157 47              0562           LR    A,7
0158 C7              0563           AS    7
```

```
0159 8104    015E 0564          BP    ON1     BR IF NOT 12V SHORT.
015B 29051E  051E 0565  ON2     JMP   SHRT    GOTO SHORT CIR ROUTINE.
015E 13           0566  ON1     SL    1
015F 91FB    015B 0567          BM    ON2     BR IF 6V SHORT.
0161 1C           0568          POP
                  0569  *
                  0570  * ONE SECOND TASKS
                  0571  *
0162 280142  0142 0572  ONES    PI    INSR
0165 01           0573          LR    A,KL
0166 1F           0574          INC           INC ONE SEC COUNTER.
0167 05           0575          LR    KL,A
0168 280561  0561 0576          PI    ACIN    GO INPUT ACRES.
016B 28065F  065F 0577          PI    FCNSW   CKECK MODE.
016E 70           0578          CLR
016F C7           0579          AS    7
0170 9404    0175 0580          BNZ   NRS     BR IF NOT 'RESET' MODE.
0172 29060A  060A 0581          JMP   REAC
0175 2507         0582  NRS     CI    7
0177 9404    017C 0583          BNZ   NTS     BR IF NOT TEST.
0179 29040A  040A 0584          JMP   TEST
017C 2505         0585  NTS     CI    5
017E 8414    0193 0586          BZ    RPMO    BR IF RPM MODE.
0180 01           0587          LR    A,KL
0181 2506         0588          CI    6
0183 940F    0193 0589          BNZ   RPMO    BR IF NOT 6TH SEC.
0185 63           0590          LISU  3
0186 6C           0591          LISL  4
0187 70           0592          CLR           CLR FAIL TBL.
0188 5E           0593          LR    D,A
0189 8FFE    0188 0594          BR7   *-1
018B 62           0595          LISU  2
018C 70           0596          CLR
018D CC           0597          AS    S
018E 8404    0193 0598          BZ    RPMO    BR IF ZERO SENSORS.
0190 29037B  037B 0599          JMP   SIXS    JMP TO SIX SEC TASKS.
0193 A5           0600  RPMO    INS   5
0194 18           0601          COM
0195 2107         0602          NI    7
0197 13           0603          SL    1
0198 2A068A  068A 0604          DCI   SCTBL
019B 8E           0605          ADC
019C 16           0606          LM
019D 55           0607          LR    5,A     MID OF SCALE.
019E 16           0608          LM
019F 56           0609          LR    6,A     LSB OF SCALE.
01A0 70           0610          CLR
01A1 51           0611          LR    1,A     MSB OF SCALE.
01A2 52           0612          LR    2,A     LSB OF RESULT.
01A3 54           0613          LR    4,A     MSB OF RESULT.
01A4 75           0614          LIS   5       INIT SUM TO 000500 DEC.
01A5 53           0615          LR    3,A     MID OF SCALE.
01A6 62           0616          LISU  2
01A7 6C           0617  M1      LISL  4
01A8 4D           0618          LR    A,I
```

```
01A9 CE        0619       AS   0
01AA 19        0620       LNK
01AB 843D 01E9 0621       BZ   FM      BR IF DONE WITH MULT.
01AD 71        0622       LIS  1
01AE FC        0623       NS   S
01AF 8416 01C6 0624       BZ   N1
01B1 2066      0625       LI   H'66'
01B3 C2        0626       AS   2
01B4 D6        0627       ASD  6
01B5 52        0628       LR   2,A
01B6 43        0629       LR   A,3
01B7 19        0630       LNK
01B8 53        0631       LR   3,A
01B9 2066      0632       LI   H'66'
01BB C5        0633       AS   5
01BC D3        0634       ASD  3
01BD 53        0635       LR   3,A
01BE 44        0636       LR   A,4
01BF 19        0637       LNK
01C0 54        0638       LR   4,A
01C1 2066      0639       LI   H'66'
01C3 C1        0640       AS   1
01C4 D4        0641       ASD  4
01C5 54        0642       LR   4,A
01C6 2066      0643  N1   LI   H'66'   ADD SCALE TO SELF.
01C8 C6        0644       AS   6
01C9 D6        0645       ASD  6
01CA 56        0646       LR   6,A
01CB 45        0647       LR   A,5
01CC 19        0648       LNK
01CD 50        0649       LR   0,A
01CE 2066      0650       LI   H'66'
01D0 C5        0651       AS   5
01D1 D0        0652       ASD  0
01D2 55        0653       LR   5,A
01D3 41        0654       LR   A,1
01D4 19        0655       LNK
01D5 50        0656       LR   0,A
01D6 2066      0657       LI   H'66'
01D8 C1        0658       AS   1
01D9 D0        0659       ASD  0
01DA 51        0660       LR   1,A
01DB 4C        0661       LR   A,S     SHIFT RIGHT, BIN #.
01DC 12        0662       SR   1
01DD 5D        0663       LR   I,A
01DE 4E        0664       LR   A,D
01DF 15        0665       SL   4
01E0 12        0666       SR   1
01E1 15        0667       SL   4
01E2 EC        0668       XS   S
01E3 5D        0669       LR   I,A
01E4 4C        0670  M3   LR   A,S
01E5 12        0671       SR   1
01E6 5C        0672       LR   S,A
01E7 90BF 01A7 0673       BR   M1
```

```
                    0674  *
                    0675  * XFER FOR DSP AND BLANK LEADING ZEROS.
                    0676  * INPUT IN R4 & R3.
                    0677  *
01E9 20D8           0678  FM      LI    H'D8'
01EB FA             0679          NS    10
01EC 5A             0680          LR    10,A        CLR RPM FAIL FLAG.
01ED 44             0681          LR    A,4
01EE 2543           0682          CI    H'43'
01F0 8205    01F6   0683          BC    RPOK        BR IF RPM <=4300.
01F2 2020           0684          LI    H'20'
01F4 EA             0685          XS    10          SET RPM FAIL FLAG.
01F5 5A             0686          LR    10,A
01F6 77             0687  RPOK    LIS   7
01F7 FB             0688          NS    11
01F8 2501           0689          CI    1
01FA 9404    01FF   0690          BNZ   RPOK1       BR IF NOT ACRES.
01FC 2905B9  05B9   0691          JMP   ACRES
01FF 44             0692  RPOK1   LR    A,4
0200 52             0693          LR    2,A
0201 14             0694          SR    4
0202 8406    0209   0695          BZ    FM1         BR IF BLANKING LEAD ZERO.
0204 2A066C  066C   0696          DCI   DBAS4
0207 8E             0697          ADC
0208 16             0698          LM                LOAD CHAR CODE FOR #1 DIGIT.
0209 54             0699  FM1     LR    4,A
020A 7F             0700          LIS   H'F'
020B F2             0701          NS    2
020C 9406    0213   0702          BNZ   FM3         BR IF DIGIT #2 NOT ZERO.
020E C4             0703          AS    4
020F 8408    0218   0704          BZ    FM4         BR IF BLANKING #2 DIGIT.
0211 7F             0705          LIS   15
0212 F2             0706          NS    2
0213 2A0676  0676   0707  FM3     DCI   DBAS5
0216 8E             0708          ADC
0217 16             0709          LM                LOAD CHAR CODE FOR #2 DIGIT.
0218 55             0710  FM4     LR    5,A
0219 43             0711          LR    A,3
021A 14             0712          SR    4
021B 2A0680  0680   0713          DCI   DBAS6
021E 8E             0714          ADC
021F 16             0715          LM                LOAD CHAR CODE FOR #3 DIGIT.
0220 56             0716          LR    6,A
0221 77             0717          LIS   7
0222 FB             0718          NS    11
0223 8446    026A   0719          BZ    MESS        BR IF 'RESET' MODE.
0225 2010           0720          LI    H'10'
0227 FA             0721          NS    10
0228 8441    026A   0722          BZ    MESS        BR IF ROW FAIL FLAG NOT SET.
                    0723  *
                    0724  *       FIND SENSOR # FOR DISPLAY.
                    0725  *
022A 62             0726  NXD     LISU  2
022B 6E             0727          LISL  6
022C 4C             0728          LR    A,S
```

```
022D 0B              0729            LR    IS,A
022E 8F04   0233 0730 BKPN           BR7   KPN
0230 201C        0731                LI    0'34'
0232 0B          0732                LR    IS,A     LOAD LAST FAIL TABLE LOCATION.
0233 70          0733 KPN            CLR
0234 CE          0734                AS    D
0235 84F8   022E 0735                BZ    BKPN     BR IF EMPTY TABLE LOCATION.
0237 56          0736                LR    6,A      KEEP SENSOR # FOR DISPLAY.
0238 0A          0737                LR    A,IS
0239 62          0738                LISU  2
023A 6E          0739                LISL  6
023B 5C          0740                LR    S,A      SAVE NEXT FAIL TABLE LOCATION.
                 0741 *
                 0742 *              BINARY TO DECIMAL CONV. (SENSOR #'S)
                 0743 *
023C 71          0744 NC7            LIS   1
023D 51          0745                LR    1,A
023E 70          0746                CLR
023F 50          0747                LR    0,A      CLR RESULT.
0240 70          0748 BTD2           CLR
0241 C6          0749                AS    6
0242 8414   0257 0750                BZ    LD1      BR IF BIN=0.
0244 2101        0751                NI    1
0246 8406   024D 0752                BZ    BTD1     BR IF LSB=0.
0248 2066        0753                LI    H'66'
024A C0          0754                AS    0        ADD ADDER TO RESULT.
024B D1          0755                ASD   1
024C 50          0756                LR    0,A
024D 46          0757 BTD1           LR    A,6      SHIFT BIN RIGHT.
024E 12          0758                SR    1
024F 56          0759                LR    6,A
0250 41          0760                LR    A,1      MULT ADDR BY 2 DEC.
0251 2466        0761                AI    H'66'
0253 D1          0762                ASD   1
0254 51          0763                LR    1,A
0255 90EA   0240 0764                BR    BTD2
0257 54          0765 LD1            LR    4,A      LOAD BLANK INTO MSD FOR DSP.
0258 40          0766                LR    A,0
0259 14          0767                SR    4
025A 8406   0261 0768                BZ    LD2      GO LOAD BLANK FOR MID DIGIT.
025C 2A0676 0676 0769                DCI   DBAS5
025F 8E          0770                ADC
0260 16          0771                LM             LOAD CHARACTER CODE FOR MID DIGIT.
0261 55          0772 LD2            LR    5,A
0262 7F          0773                LIS   15
0263 F0          0774                NS    0
0264 2A0680 0680 0775                DCI   DBAS6
0267 8E          0776                ADC
0268 16          0777                LM
0269 56          0778                LR    6,A      LOAD LSB FOR DSP.
                 0779 *
                 0780 *              MESSAGE LOADING.
                 0781 *
026A 77          0782 MESS           LIS   7
026B FB          0783                NS    11
```

```
026C 841F  0280 0784        BZ    RAC       BR IF 'RESET' MODE.
026E 2507       0785        CI    7
0270 940F  0280 0786        BNZ   NT        BR IF NOT TEST MODE.
0272 CB         0787        AS    11
0273 8104  0278 0788        BP    NF        BR IF TEST+FAILED.
0275 7C         0789        LIS   H'C'
0276 53         0790        LR    3,A
0277 1C         0791  LEVM  POP             POP TO TEST.
0278 13         0792  NF    SL    1
0279 81FD  0277 0793        BP    LEVM
027B 2014       0794        LI    H'14'
027D 53         0795        LR    3,A
027E 90F8  0277 0796        BR    LEVM      BR TO RETURN TO TEST.
0280 2505       0797  NT    CI    5
0282 940D  0290 0798        BNZ   NR        BR IF NOT RPM MODE.
0284 71         0799        LIS   1
0285 53         0800        LR    3,A
0286 46         0801        LR    A,6       INSERT D.P.
0287 2280       0802        OI    H'80'
0289 56         0803        LR    6,A
028A 902D  02B8 0804        BR    TDSP
028C 72         0805  RAC   LIS   2         HERE IF 'RESET ACRES'.
028D 53         0806        LR    3,A
028E 9029  02B8 0807        BR    TDSP
0290 2010       0808  NR    LI    H'10'     HERE IF 'SILENT', 'ON' OR 'ACRES'.
0292 FA         0809        NS    10
0293 8406  029A 0810        BZ    NRF       BR IF NO ROW FAIL.
0295 2030       0811        LI    H'30'
0297 53         0812        LR    3,A
0298 9011  02AA 0813        BR    HCK       BR FOR HOPPER CHK.
029A 77         0814  NRF   LIS   7
029B FB         0815        NS    11
029C 2501       0816        CI    1
029E 9405  02A4 0817        BNZ   NAS       BR IF NOT 'ACRES'.
02A0 72         0818        LIS   2
02A1 53         0819        LR    3,A
02A2 9007  02AA 0820        BR    HCK
02A4 71         0821  NAS   LIS   1
02A5 53         0822        LR    3,A
02A6 46         0823        LR    A,6
02A7 2280       0824        OI    H'80'
02A9 56         0825        LR    6,A       INSERT D.P.
02AA 78         0826  HCK   LIS   8
02AB FA         0827        NS    10
02AC 840B  02B8 0828        BZ    TDSP      BR IF HOPPER NOT LO.
02AE A5         0829        INS   5
02AF 2340       0830        XI    H'40'
02B1 2178       0831        NI    H'78'
02B3 B5         0832        OUTS  5         TOGGLE HOPPER MESSAGE FLAG.
02B4 2140       0833        NI    H'40'
02B6 E3         0834        XS    3
02B7 53         0835        LR    3,A
02B8 280325 0325 0836 TDSP  PI    DSP
                0837  *
                0838  * ALARM PRIORITIZING.
```

```
                            0839  *
02BB 28065F 065F 0840       PI    FCNSW   CHECK MODE.
02BE 77          0841       LIS   7
02BF FB          0842       NS    11
02C0 9404   02C5 0843       BNZ   Z6      BR IF NOT 'RESET' MODE.
02C2 29060A 060A 0844       JMP   REAC
02C5 50          0845  Z6   LR    0,A     SAVE MODE TEMPORARILY.
02C6 20BF        0846       LI    H'BF'   CLR 1/2 SEC ALARM OFF FLAG.
02C8 FA          0847       NS    10
02C9 5A          0848       LR    10,A
02CA 2020        0849       LI    H'20'
02CC FA          0850       NS    10
02CD 840A   02D8 0851       BZ    Z1      BR IF NO RPM FAIL.
02CF 2048        0852  Z4   LI    H'48'
02D1 B0          0853       OUTS  0       ALARM ON.
02D2 4A          0854       LR    A,10
02D3 2240        0855       OI    H'40'   SET HAF SEC OFF FLAG.
02D5 5A          0856       LR    10,A
02D6 9045   031C 0857       BR    ZEN
02D8 2010        0858  Z1   LI    H'10'
02DA FA          0859       NS    10
02DB 8427   0303 0860       BZ    Z2      BR IF NO ROW FAIL.
02DD 78          0861       LIS   8
02DE FB          0862       NS    11
02DF 840E   02EE 0863       BZ    Z5      BR IF NOT 50% FAIL.
02E1 A5          0864       INS   5
02E2 2110        0865       NI    H'10'
02E4 941E   0303 0866       BNZ   Z2      BR IF 1ST PASS 50% FAIL SET.
02E6 A5          0867       INS   5
02E7 2210        0868       OI    H'10'
02E9 2178        0869       NI    H'78'
02EB B5          0870       OUTS  5       SET 50% 1ST PASS FLAG.
02EC 90E2   02CF 0871       BR    Z4
02EE A5          0872  Z5   INS   5
02EF 2168        0873       NI    H'68'
02F1 B5          0874       OUTS  5       CLR 50% 1ST PASS FLAG.
02F2 40          0875       LR    A,0
02F3 2506        0876       CI    6
02F5 8405   02FB 0877       BZ    Z22     BR IF 'ON' MODE.
02F7 2501        0878       CI    1
02F9 9409   0303 0879       BNZ   Z2      BR IF NOT 'ACRES'.
02FB A0          0880  Z22  INS   0
02FC 2148        0881       NI    H'48'
02FE 2340        0882       XI    H'40'   TOGGLE ALARM STATUS.
0300 B0          0883       OUTS  0
0301 901A   031C 0884       BR    ZEN
0303 78          0885  Z2   LIS   8
0304 FA          0886       NS    10
0305 840E   0314 0887       BZ    Z3      BR IF NO HOPPER FAIL.
0307 A5          0888       INS   5
0308 2120        0889       NI    H'20'
030A 940D   0318 0890       BNZ   Z7      BR IF 1ST PASS HOPPER FLAG SET.
030C A5          0891       INS   5
030D 2220        0892       OI    H'20'
030F 2178        0893       NI    H'78'
```

```
0311 B5            0894            OUTS  5        SET HOPPER 1ST PASS FLAG.
0312 90BC  02CF    0895            BR    Z4       BR IF 1/2 SEC ALARM FLAG SET.
0314 A5            0896   Z3       INS   5
0315 2158          0897            NI    H'58'
0317 B5            0898            OUTS  5        CLR 1ST PASS HOPPER FLAG.
0318 A0            0899   Z7       INS   0        ALARM OFF.
0319 2108          0900            NI    8
031B B0            0901            OUTS  0
031C 20FB          0902   ZEN      LI    H'FB'    CLR ONE SEC FLAG.
031E FA            0903            NS    10
031F 2202          0904            OI    2        SET WAIT FLAG.
0321 5A            0905            LR    10,A
0322 1B            0906            EI
0323 90FE  0322    0907            BR    *-1
                   0908   *
                   0909   * DISPLAY UPDATE.
                   0910   *
0325 43            0911   DSP      LR    A,3
0326 13            0912            SL    1
0327 53            0913            LR    3,A
0328 44            0914            LR    A,4
0329 12            0915            SR    1
032A 12            0916            SR    1
032B 14            0917            SR    4
032C E3            0918            XS    3
032D 53            0919            LR    3,A
032E 44            0920            LR    A,4
032F 13            0921            SL    1
0330 13            0922            SL    1
0331 54            0923            LR    4,A
0332 45            0924            LR    A,5
0333 12            0925            SR    1
0334 14            0926            SR    4
0335 E4            0927            XS    4
0336 54            0928            LR    4,A
0337 45            0929            LR    A,5
0338 13            0930            SL    1
0339 13            0931            SL    1
033A 13            0932            SL    1
033B 55            0933            LR    5,A
033C 46            0934            LR    A,6
033D 13            0935            SL    1
033E 12            0936            SR    1
033F 14            0937            SR    4
0340 E5            0938            XS    5
0341 55            0939            LR    5,A
0342 70            0940            CLR
0343 C6            0941            AS    6
0344 8107  034C    0942            BP    REP1
0346 15            0943            SL    4
0347 2208          0944            OI    8
0349 56            0945            LR    6,A
034A 9003  034E    0946            BR    REP2
034C 15            0947   REP1     SL    4
034D 56            0948            LR    6,A
```

```
034E 2020      0949 REP2  LI    32
0350 51        0950       LR    1,A
0351 A0        0951       INS   0
0352 2148      0952       NI    H'48'      SAVE ALARM STATUS.
0354 50        0953       LR    0,A
0355 60        0954       LISU  0
0356 6B        0955       LISL  3
0357 70        0956 DP1   CLR
0358 CC        0957       AS    S
0359 40        0958 DP2   LR    A,0        DSP CLK HI.
035A 9103 035E 0959       BM    DP3
035C 2220      0960       OI    H'20'
035E B0        0961 DP3   OUTS  0
035F 2210      0962       OI    H'10'
0361 B0        0963       OUTS  0          DSP CLK LO.
0362 31        0964       DS    1
0363 77        0965       LIS   7
0364 F1        0966       NS    1          TIME TO CHANGE REGISTERS ?
0365 8406 036C 0967       BZ    DP4
0367 4C        0968       LR    A,S        NO, JUST SHIFT LEFT.
0368 13        0969       SL    1
0369 5C        0970       LR    S,A
036A 90EE 0359 0971       BR    DP2
036C 4D        0972 DP4   LR    A,I        PT TO NEXT REGISTER.
036D 70        0973       CLR
036E C1        0974       AS    1
036F 94E7 0357 0975       BNZ   DP1
0371 2040      0976       LI    H'40'
0373 F0        0977       NS    0
0374 2220      0978       OI    H'20'
0376 B0        0979       OUTS  0          LOAD DISPLAY.
0377 2208      0980       OI    8
0379 B0        0981       OUTS  0
037A 1C        0982       POP
               0983  0
               0984  0               SIX SECOND TASKS.
               0985  0
037B 20EF      0986 SIXS  LI    H'EF'
037D FA        0987       NS    10         CLR ROW FAIL FLAG.
037E 5A        0988       LR    10,A
037F 70        0989       CLR
0380 50        0990       LR    0,A        CLR TSFC (R0).
0381 A4        0991       INS   4
0382 210F      0992       NI    15         READ SEED RATE.
0384 250B      0993       CI    H'B'
0386 9404 038B 0994       BNZ   SX4        BR IF NOT LAST SW POSITION.
0388 78        0995       LIS   8          PATCH-IN LAST SEED RATE.
0389 9003 038D 0996       BR    SX5
038B 2107      0997 SX4   NI    7          MASK OFF SEED RATE.
038D 51        0998 SX5   LR    1,A        SVTBL PNTR IN (R1).
038E 2A0FC0 0FC0 0999     DCI   URAM
0391 2C        1000       XDC
0392 201C      1001       LI    0'34'
0394 53        1002       LR    3,A        FAIL TBL PNTR IN (R3).
0395 71        1003       LIS   1
```

```
0396 54              1004            LR    4,A      # OF SENSORS IN (R4).
                     1005  *
0397 2A0698 0698 1006 SX1            DCI   SVTBL
039A 41              1007            LR    A,1
039B 8E              1008            ADC
039C 44              1009            LR    A,4
039D 2540            1010            CI    64
039F 922A   03CA 1011                BNC   ISCK     BR IF POP IS IN SXPD.
03A1 2C              1012            XDC
03A2 16              1013            LM
03A3 2C              1014            XDC
03A4 8D              1015            CM
03A5 8405   03AB 1016                BZ    NXT      SR-POP.
03A7 9203   03AB 1017                BNC   NXT
03A9 900D   03B7 1018                BR    BAD
03AB 62              1019  NXT       LISU  2
03AC 6F              1020            LISL  7
03AD 44              1021            LR    A,4      INC TEMP SENSOR CNTR.
03AE 1F              1022            INC
03AF 54              1023            LR    4,A
03B0 18              1024            COM
03B1 1F              1025            INC
03B2 CC              1026            AS    S
03B3 82E3   0397 1027                BC    SX1
03B5 901F   03D5 1028                BR    TSCK     BR TO CHECK FAIL TOTAL.
03B7 43              1029  BAD       LR    A,3
03B8 0B              1030            LR    IS,A
03B9 8F0A   03C4 1031                BR7   NSKT     BR IF TABLE NOT FULL.
03BB 71              1032  SKT       LIS   1        INC TOTAL FAIL CNTS.
03BC C0              1033            AS    0
03BD 50              1034            LR    0,A
03BE 4A              1035            LR    A,10
03BF 2210            1036            OI    H'10'    SET ROW FAIL FLAG.
03C1 5A              1037            LR    10,A
03C2 90E8   03AB 1038                BR    NXT      BR FOR NEXT SENSOR CHK.
03C4 44              1039  NSKT      LR    A,4      PUT SENSOR # IN FAIL TBL.
03C5 5E              1040            LR    D,A
03C6 0A              1041            LR    A,IS
03C7 53              1042            LR    3,A
03C8 90F2   03BB 1043                BR    SKT
                     1044  *
03CA 24DC            1045  ISCK      AI    -36
03CC 0B              1046            LR    IS,A     POINT TO SXPD ACCUMULATOR.
03CD 4C              1047            LR    A,S
03CE 8D              1048            CM
03CF 84DB   03AB 1049                BZ    NXT
03D1 92D9   03AB 1050                BNC   NXT
03D3 90E3   03B7 1051                BR    BAD
                     1052  *
03D5 62              1053  TSCK      LISU  2
03D6 6F              1054            LISL  7
03D7 4C              1055            LR    A,S      50%-# OF FAILS.
03D8 12              1056            SR    1
03D9 51              1057            LR    1,A
03DA 20E7            1058            LI    H'E7'
```

```
03DC FB              1059            NS    11         CLR 'FIRST ERR' FLAG.
03DD 5B              1060            LR    11,A       CLR 50% FAIL FLAG.
03DE 40              1061            LR    A,0
03DF 18              1062            COM
03E0 1F              1063            INC              50%-# FAILS.
03E1 C1              1064            AS    1
03E2 8109    03EC    1065            BP    NER        BR IF NOT 50% FAILURES.
03E4 4B              1066            LR    A,11
03E5 2208            1067            OI    8          SET 50% FAIL FLAG.
03E7 5B              1068            LR    11,A
                     1069    *
                     1070    *   SOUND ALARM ONCE EACH 6 SECS FOR >50% FAILURE.
03E8 A5              1071            INS   5
03E9 2168            1072            NI    H'68'      CLR 1ST PASS 50% FAIL FLAG.
03EB B5              1073            OUTS  5
                     1074    *
03EC 2040            1075    NER     LI    64         CLR POP ACCUMS.
03EE 50              1076            LR    0,A
03EF 2A0FC0  0FC0    1077            DCI   .URAM
03F2 70              1078            CLR
03F3 17              1079            ST
03F4 30              1080            DS    0
03F5 94FD    03F3    1081            BNZ   *-2
03F7 2023            1082            LI    35
03F9 50              1083            LR    0,A
03FA 203F            1084            LI    O'77'
03FC 51              1085            LR    1,A
03FD 41              1086    C1      LR    A,1
03FE 0B              1087            LR    IS,A
03FF 70              1088            CLR
0400 5C              1089            LR    S,A
0401 31              1090            DS    1
0402 30              1091            DS    0
0403 94F9    03FD    1092            BNZ   C1
0405 70              1093    SX3     CLR
0406 05              1094            LR    KL,A       CLR SIX SEC COUNTER.
0407 290193  0193    1095            JMP   RPMO
                     1096    *
040A 1A              1097    TEST    DI
040B 280142  0142    1098            PI    INSR
040E 76              1099            LIS   6          CLK HI.
040F B1              1100            OUTS  1          RESET LO.
0410 78              1101            LIS   8
0411 B0              1102            OUTS  0          ALARM OFF.
0412 70              1103            CLR
0413 58              1104            LR    8,A        INIT SENSOR CNTR.
0414 2804FD  04FD    1105            PI    TD2
0417 77              1106            LIS   7          RESET HI.
0418 B1              1107            OUTS  1
0419 2804FD  04FD    1108            PI    TD2
041C A1              1109            INS   1
041D 810D    042B    1110            BP    TT8        BR IF TERM OFF.
041F 2014            1111            LI    H'14'
0421 53              1112            LR    3,A        LOAD 'TEST FAILED' MESSAGE.
0422 204F            1113            LI    H'4F'      LOAD 'D'.
```

| | | | | | | |
|---|---|---|---|---|---|---|
| 0424 | 54 | | 1114 | | LR | 4,A |
| 0425 | 70 | | 1115 | | CLR | |
| 0426 | 55 | | 1116 | | LR | 5,A |
| 0427 | 56 | | 1117 | | LR | 6,A |
| 0428 | 2904D8 | 04D8 | 1118 | | JMP | TT3 |
| 042B | 13 | | 1119 | TT8 | SL | 1 |
| 042C | 810D | 043A | 1120 | | BP | TT9   BR IF DATA OFF. |
| 042E | 2014 | | 1121 | | LI | H'14' |
| 0430 | 53 | | 1122 | | LR | 3,A   LOAD 'TEST FAILED' MESSAGE. |
| 0431 | 2036 | | 1123 | | LI | H'36'   LOAD 'C'. |
| 0433 | 54 | | 1124 | | LR | 4,A |
| 0434 | 70 | | 1125 | | CLR | |
| 0435 | 55 | | 1126 | | LR | 5,A |
| 0436 | 56 | | 1127 | | LR | 6,A   LOAD BLANKS. |
| 0437 | 2904D8 | 04D8 | 1128 | | JMP | TT3 |
| 043A | 75 | | 1129 | TT9 | LIS | 5 |
| 043B | B1 | | 1130 | | OUTS | 1   CLK LO. |
| 043C | 2804FD | 04FD | 1131 | | PI | TD2 |
| 043F | 2804FD | 04FD | 1132 | | PI | TD2 |
| 0442 | 74 | | 1133 | | LIS | 4 |
| 0443 | 53 | | 1134 | | LR | 3,A   LOAD 'TEST' MESSAGE. |
| 0444 | A1 | | 1135 | | INS | 1 |
| 0445 | 810F | 0455 | 1136 | | BP | TT6   BR IF NO TERM. |
| 0447 | 2014 | | 1137 | TEFB | LI | H'14' |
| 0449 | 53 | | 1138 | | LR | 3,A   LOAD 'TEST FAILED' MESSAGE. |
| 044A | 206D | | 1139 | | LI | H'6D' |
| 044C | 54 | | 1140 | | LR | 4,A   LOAD 'H'. |
| 044D | 2079 | | 1141 | | LI | H'79' |
| 044F | 55 | | 1142 | | LR | 5,A   LOAD 'P'. |
| 0450 | 70 | | 1143 | | CLR | |
| 0451 | 56 | | 1144 | | LR | 6,A |
| 0452 | 2904D8 | 04D8 | 1145 | | JMP | TT3 |
| 0455 | 13 | | 1146 | TT6 | SL | 1 |
| 0456 | 910C | 0463 | 1147 | | BM | DON   BR IF DATA ON. |
| 0458 | 206D | | 1148 | | LI | H'6D'   LOAD 'H'. |
| 045A | 54 | | 1149 | | LR | 4,A |
| 045B | 2079 | | 1150 | | LI | H'79'   LOAD 'P'. |
| 045D | 55 | | 1151 | | LR | 5,A |
| 045E | 2047 | | 1152 | | LI | H'47'   LOAD 'F'. |
| 0460 | 56 | | 1153 | | LR | 6,A |
| 0461 | 900A | 046C | 1154 | | BR | DOUT |
| 0463 | 206D | | 1155 | DON | LI | H'6D'   LOAD 'H'. |
| 0465 | 54 | | 1156 | | LR | 4,A |
| 0466 | 2079 | | 1157 | | LI | H'79'   LOAD 'P'. |
| 0468 | 55 | | 1158 | | LR | 5,A |
| 0469 | 2067 | | 1159 | | LI | H'67'   LOAD 'E'. |
| 046B | 56 | | 1160 | | LR | 6,A |
| 046C | 280325 | 0325 | 1161 | DOUT | PI | DSP |
| 046F | 28050F | 050F | 1162 | | PI | TD4 |
| 0472 | A0 | | 1163 | TT1 | INS | 0   CHECK FOR MODE CHANGE. |
| 0473 | 2107 | | 1164 | | NI | 7 |
| 0475 | 2507 | | 1165 | | CI | 7 |
| 0477 | 8404 | 047C | 1166 | | BZ | TT7   BR IF NO MODE CHANGE. |
| 0479 | 29079E | 079E | 1167 | | JMP | TST |
| 047C | 280142 | 0142 | 1168 | TT7 | PI | INSR |

```
047F 48              1169         LR    A,8
0480 2563            1170         CI    99
0482 916A    04ED    1171         BM    TEFA      BR IF SENSOR CNT > 100.
0484 77              1172         LIS   7
0485 B1              1173         OUTS  1         CLK HI.
0486 2804FD  04FD    1174         PI    TD2
0489 2804FD  04FD    1175         PI    TD2
048C A1              1176         INS   1
048D 915F    04ED    1177         BM    TEFA      BR IF TERM ON.
048F 13              1178         SL    1
0490 915C    04ED    1179         BM    TEFA      BR IF DATA OFF.
0492 48              1180         LR    A,8
0493 56              1181         LR    6,A
0494 28023C  023C    1182         PI    NC7
0497 280325  0325    1183         PI    DSP       DISPLAY SENSOR #.
049A 75              1184         LIS   5
049B B1              1185         OUTS  1         CLK LO.
049C 71              1186         LIS   1
049D C8              1187         AS    8
049E 58              1188         LR    8,A       INC SENSOR CNTR.
049F 280503  0503    1189         PI    TD3
04A2 A1              1190         INS   1
04A3 8144    04E8    1191         BP    OKP       BR IF TERM OFF.
                     1192   * TERM CHECK.
04A5 76              1193         LIS   6
04A6 B1              1194         OUTS  1         RESET LO.
04A7 2804FD  04FD    1195         PI    TD2
04AA 77              1196         LIS   7
04AB B1              1197         OUTS  1         RESET HI.
04AC 280503  0503    1198         PI    TD3
04AF A1              1199         INS   1
04B0 913C    04ED    1200         BM    TEFA      BR IF TERM ON.
04B2 13              1201         SL    1
04B3 9139    04ED    1202         BM    TEFA      BR IF DATA ON.
04B5 20BF            1203         LI    H'BF'     CLR FAILED FLAG.
04B7 FB              1204         NS    11
04B8 2280            1205         OI    H'80'     SET TEST PASSED FLAG.
04BA 5B              1206         LR    11,A
04BB 2804FD  04FD    1207         PI    TD2
04BE 7C              1208         LIS   H'C'
04BF 53              1209         LR    3,A       LOAD 'TEST PASSED' MESSAGE.
04C0 2076            1210         LI    H'76'     LOAD 'E'.
04C2 54              1211         LR    4,A
04C3 2045            1212         LI    H'45'     LOAD 'N'.
04C5 55              1213         LR    5,A
04C6 2079            1214         LI    H'79'     LOAD 'D'.
04C8 56              1215         LR    6,A
04C9 280325  0325    1216         PI    DSP
04CC 280503  0503    1217         PI    TD3
04CF 280503  0503    1218         PI    TD3
04D2 38              1219   TT2   DS    8         DEC SENSOR CNTR.
04D3 48              1220         LR    A,8
04D4 56              1221         LR    6,A       LOAD SENSOR # FOR DISPLAY.
04D5 28023C  023C    1222         PI    NC7
04D8 280325  0325    1223   TT3   PI    DSP
```

```
04DB 280142 0142 1224 TCK    PI   INSR
04DE A0            1225           INS  0
04DF 2107          1226           NI   7
04E1 2507          1227           CI   7           INPUT MODE.
04E3 84F7  04DB 1228              BZ   TCK         BR IF TEST MODE.
04E5 29079E 079E 1229             JMP  TST
04E8 13            1230 OKP       SL   1
04E9 8103  04ED 1231              BP   TEFA        BR IF DATA OFF.
04EB 9086  0472 1232              BR   TT1
                   1233 *
04ED 70            1234 TEFA      CLR
04EE C8            1235           AS   8
04EF 9404  04F4 1236              BNZ  TT11        BR IF NOT HOPPER CHK.
04F1 290447 0447 1237             JMP  TEFB
04F4 207F          1238 TT11      LI   H'7F'       CLR PASSED FLAG.
04F6 FB            1239           NS   11
04F7 2240          1240           OI   H'40'       SET FAILED FLAG.
04F9 5B            1241           LR   11,A
04FA 90D7  04D2 1242              BR   TT2
04FC 1C            1243 TD1       POP              17 MICROSEC DELAY.
04FD 77            1244 TD2       LIS  7           102 MICROSEC DELAY.
04FE 24FF          1245           AI   -1
0500 94FD  04FE 1246              BNZ  *-2
0502 1C            1247           POP
0503 2061          1248 TD3       LI   97          QUARTER SEC DELAY.
0505 51            1249           LR   1,A
0506 70            1250           CLR
0507 50            1251           LR   0,A
0508 30            1252           DS   0
0509 94FE  0508 1253              BNZ  *-1
050B 31            1254           DS   1
050C 94FC  0509 1255              BNZ  *-3
050E 1C            1256           POP
050F 73            1257 TD4       LIS  3           2 SEC DELAY.
0510 50            1258           LR   0,A
0511 70            1259           CLR
0512 51            1260           LR   1,A
0513 52            1261           LR   2,A
0514 32            1262           DS   2
0515 94FE  0514 1263              BNZ  *-1
0517 31            1264           DS   1
0518 94FC  0515 1265              BNZ  *-3
051A 30            1266           DS   0
051B 94FA  0516 1267              BNZ  *-5
051D 1C            1268           POP
                   1269 *
                   1270 * SHORT CIRCUIT ROUTINE.
                   1271 *
051E 1A            1272 SHRT      DI
051F 70            1273           CLR
0520 53            1274           LR   3,A         BLANK ALL MESSAGES.
0521 2048          1275           LI   H'48'
0523 B0            1276           OUTS 0           ALARM ON.
0524 2073          1277           LI   H'73'       LOAD "S".
0526 54            1278           LR   4,A
0527 206D          1279           LI   H'6D'       LOAD "H".
0529 55            1280           LR   5,A
052A 2066          1281           LI   H'66'       LOAD "C".
```

```
052C 56              1282        LR    6,A
052D 280325 0325 1283            PI    DSP
0530 28050F 050F 1284            PI    TD4
0533 70              1285        CLR
0534 54              1286        LR    4,A         CLR LAST DSP CHARACTER.
0535 47              1287        LR    A,7
0536 13              1288        SL    1
0537 13              1289        SL    1
0538 8109 0542  1290             BP    NSIX
053A 2076            1291        LI    H'76'       LOAD "S".
053C 55              1292        LR    5,A
053D 2062            1293        LI    H'62'       LOAD "L".
053F 56              1294        LR    6,A
0540 900B 054C  1295             BR    SH1
0542 47              1296 NSIX   LR    A,7
0543 13              1297        SL    1
0544 8107 054C  1298             BP    SH1
0546 206D            1299        LI    H'6D'       LOAD "H".
0548 55              1300        LR    5,A
0549 204F            1301        LI    H'4F'       LOAD "P".
054B 56              1302        LR    6,A
054C 280325 0325 1303  SH1       PI    DSP
054F 280503 0503 1304            PI    TD3
0552 280503 0503 1305            PI    TD3
0555 280503 0503 1306            PI    TD3
0558 280503 0503 1307            PI    TD3
055B 280142 0142 1308            PI    INSR
055E 29079E 079E 1309            JMP   TST
                     1310   *
                     1311   *  ACRES
                     1312   *
0561 A5              1313 ACIN   INS   5
0562 2180            1314        NI    H'80'
0564 12              1315        SR    1
0565 12              1316        SR    1
0566 57              1317        LR    7,A
0567 2020            1318        LI    H'20'
0569 FB              1319        NS    11
056A E7              1320        XS    7
056B 844C 05B8  1321             BZ    NTR
056D 4B              1322        LR    A,11
056E 2320            1323        XI    H'20'
0570 5B              1324        LR    11,A
0571 62              1325        LISU  2
0572 68              1326        LISL  0
0573 02              1327        LR    A,QU
0574 CC              1328        AS    S
0575 5D              1329        LR    I,A
0576 03              1330        LR    A,QL
0577 19              1331        LNK
0578 1E              1332        LR    J,W
0579 CC              1333        AS    S
057A 8202 057D  1334             BC    *+3
057C 1D              1335        LR    W,J
057D 5D              1336        LR    I,A
```

```
057E 4C              1337            LR    A,S
057F 19              1338            LNK
0580 5D              1339            LR    I,A
0581 4C              1340            LR    A,S
0582 19              1341            LNK
0583 5C              1342            LR    S,A
                     1343    *       LIMIT ACRES TO 999.9  (ACRES ARE IN BINARY)
0584 4C              1344            LR    A,S
0585 2526            1345            CI    38
0587 820A   0592     1346            BC    ACOT         BR IF MSD OF ACRES NOT >=39.
0589 4D              1347            LR    A,I
058A 4E              1348            LR    A,D
058B 250F            1349            CI    15
058D 8204   0592     1350            BC    ACOT         BR IF LSD OF ACRES NOT >=16.
058F 29062C 062C     1351            JMP   ZACR         BR TO RESET ACRES TO 0.
                     1352    *
                     1353    *       SHIFT OUT ACRES
                     1354    *
0592 A1              1355   ACOT     INS   1
0593 15              1356            SL    4
0594 9123   05B8     1357            BM    NTR          BR IF DYING.
                     1358    *
0596 4E              1359            LR    A,D
0597 18              1360            COM
0598 B4              1361            OUTS  4      1
0599 13              1362            SL    1
059A B4              1363            OUTS  4      2
059B 13              1364            SL    1
059C B4              1365            OUTS  4      3
059D 13              1366            SL    1
059E B4              1367            OUTS  4      4
059F 13              1368            SL    1
05A0 B4              1369            OUTS  4      5
05A1 13              1370            SL    1
05A2 B4              1371            OUTS  4      6
05A3 13              1372            SL    1
05A4 B4              1373            OUTS  4      7
05A5 13              1374            SL    1
05A6 B4              1375            OUTS  4      8
                     1376    *
05A7 4C              1377            LR    A,S
05A8 18              1378            COM
05A9 B4              1379            OUTS  4      9
05AA 13              1380            SL    1
05AB B4              1381            OUTS  4      10
05AC 13              1382            SL    1
05AD B4              1383            OUTS  4      11
05AE 13              1384            SL    1
05AF B4              1385            OUTS  4      12
05B0 13              1386            SL    1
05B1 B4              1387            OUTS  4      13
05B2 13              1388            SL    1
05B3 B4              1389            OUTS  4      14
05B4 13              1390            SL    1
05B5 B4              1391            OUTS  4      15
```

```
05B6 13            1392            SL    1
05B7 B4            1393            OUTS  4        16
05B8 1C            1394  NTR       POP
                   1395  *
                   1396  *  ACRES MODE
                   1397  *
                   1398  *  CONVERT BINARY TO DECIMAL ACRES.
05B9 A5            1399  ACRES     INS   5
05BA 2170          1400            NI    H'70'
05BC 2208          1401            OI    8
05BE B5            1402            OUTS  5        SET ACRES DISPLAYED FLAG.
05BF 62            1403            LISU  2
05C0 6A            1404            LISL  2
05C1 4D            1405            LR    A,I
05C2 50            1406            LR    0,A
05C3 4C            1407            LR    A,S
05C4 51            1408            LR    1,A
05C5 70            1409            CLR
05C6 54            1410            LR    4,A       MSD RESULT.
05C7 55            1411            LR    5,A       LSD RESULT.
05C8 52            1412            LR    2,A       MSD ADDER.
05C9 71            1413            LIS   1
05CA 53            1414            LR    3,A       LSD ADDER.
                   1415  *
05CB 70            1416  CONL      CLR
05CC 40            1417            LR    A,0
05CD C1            1418            AS    1
05CE 19            1419            LNK
05CF 842E  05FE    1420            BZ    DCA       BR IF DONE CONVERTING ACRES.
05D1 71            1421            LIS   1
05D2 F0            1422            NS    0
05D3 840E  05E2    1423            BZ    DNS       BR IF BIT = 0.
05D5 2066          1424            LI    H'66'
05D7 C5            1425            AS    5
05D8 D3            1426            ASD   3
05D9 55            1427            LR    5,A
05DA 44            1428            LR    A,4
05DB 19            1429            LNK
05DC 54            1430            LR    4,A
05DD 2066          1431            LI    H'66'
05DF C2            1432            AS    2
05E0 D4            1433            ASD   4
05E1 54            1434            LR    4,A
05E2 2066          1435  DNS       LI    H'66'     ADDER X 2 DECIMAL.
05E4 C3            1436            AS    3
05E5 D3            1437            ASD   3
05E6 53            1438            LR    3,A
05E7 42            1439            LR    A,2
05E8 19            1440            LNK
05E9 56            1441            LR    6,A
05EA 2066          1442            LI    H'66'
05EC C2            1443            AS    2
05ED D6            1444            ASD   6
05EE 52            1445            LR    2,A
```

```
                1446  * SHIFT BINARY # RIGHT ONE BIT.
05EF 40         1447        LR    A,0
05F0 12         1448        SR    1
05F1 50         1449        LR    0,A
05F2 71         1450        LIS   1
05F3 F1         1451        NS    1
05F4 15         1452        SL    4
05F5 12         1453        SR    1
05F6 15         1454        SL    4
05F7 E0         1455        XS    0
05F8 50         1456        LR    0,A
05F9 41         1457        LR    A,1
05FA 12         1458        SR    1
05FB 51         1459        LR    1,A
05FC 90CE  05CB 1460        BR    CONL
                1461  *
05FE 45         1462  DCA   LR    A,5
05FF 53         1463        LR    3,A
0600 2010       1464        LI    H'10'
0602 FA         1465        NS    10
0603 9403  0607 1466        BNZ   LA0         BR IF ROW FAIL FLAG SET.
0605 78         1467        LIS   8
0606 B0         1468        OUTS  0           ELSE ALARM OFF.
0607 2901FF 01FF 1469 LA0   JMP   RPOK1
                1470  *
                1471  * RESET ACRE COUNTER
                1472  *
060A A5         1473  REAC  INS   5
060B 15         1474        SL    4
060C 9104  0611 1475        BM    RE1
060E 2905B9 05B9 1476 NTCL  JMP   ACRES
0611 62         1477  RE1   LISU  2
0612 6A         1478        LISL  2
0613 70         1479        CLR
0614 CD         1480        AS    I
0615 CC         1481        AS    S
0616 84F7  060E 1482        BZ    NTCL
0618 2034       1483        LI    52
061A 50         1484        LR    0,A
061B 70         1485        CLR
061C 51         1486        LR    1,A
061D 2048       1487        LI    H'48'
061F B0         1488        OUTS  0           ALARM ON.
0620 28065F 065F 1489       PI    FCNSW
0623 280142 0142 1490       PI    INSR
0626 31         1491        DS    1
0627 94F8  0620 1492        BNZ   *-7
0629 30         1493        DS    0
062A 94F5  0620 1494        BNZ   *-10
062C 70         1495  ZACR  CLR
062D 5E         1496        LR    D,A
062E 8FFE  062D 1497        BR7   *-1
0630 6B         1498        LISL  3
0631 290592 0592 1499       JMP   ACOT
                1500  *
```

```
                1501  * CRUNCH DATA FROM SHIFT REGISTERS
                1502  *
0634 70         1503  DCRU    CLR
0635 52         1504          LR    2,A
0636 53         1505          LR    3,A        CLR COMPRESSION REGISTERS.
0637 6F         1506          LISL  7
                1507  *
0638 70         1508  DC2     CLR
0639 CE         1509          AS    D
063A 9109  0644 1510          BM    DC1        BR IF DATA BIT = 0.
063C 43         1511          LR    A,3
063D 13         1512          SL    1
063E 1F         1513          INC
063F 53         1514          LR    3,A
0640 8FF7  0638 1515          BR7   DC2
0642 9006  0649 1516          BR    DC3
0644 43         1517  DC1     LR    A,3
0645 13         1518          SL    1
0646 53         1519          LR    3,A
0647 8FF0  0638 1520          BR7   DC2
                1521  * NEXT BYTE
0649 0A         1522  DC3     LR    A,IS
064A 24F8       1523          AI    -8
064C 0B         1524          LR    IS,A
064D 70         1525  DC5     CLR
064E CE         1526          AS    D
064F 9109  0659 1527          BM    DC4
0651 42         1528          LR    A,2
0652 13         1529          SL    1
0653 1F         1530          INC
0654 52         1531          LR    2,A
0655 8FF7  064D 1532          BR7   DC5
0657 9006  065E 1533          BR    DC6
0659 42         1534  DC4     LR    A,2
065A 13         1535          SL    1
065B 52         1536          LR    2,A
065C 8FF0  064D 1537          BR7   DC5
                1538  *
065E 1C         1539  DC6     POP
                1540  *
                1541  * INPUT FUNCTION SWITCH
                1542  *
065F A0         1543  FCNSW   INS   0
0660 2107       1544          NI    7
0662 57         1545          LR    7,A
0663 77         1546          LIS   7
0664 FB         1547          NS    11
0665 E7         1548          XS    7
0666 9402  0669 1549          BNZ   FCN1       BR IF NEW FUNCTION SELECTED.
0668 1C         1550          POP
0669 29079E 079E 1551 FCN1    JMP   TST
                1552  *
                1553  *
                1554  *
```

| | | | | | |
|---|---|---|---|---|---|
| 066C | 3F095E | 1555 | DBAS4 | DC | H'3F095E5B69737719' |
| 0674 | 7F7B | 1556 | | DC | H'7F7B' |
| 0676 | 3F0C5B | 1557 | DBAS5 | DC | H'3F0C5E5E6C76771C' |
| 067E | 7F7E | 1558 | | DC | H'7F7E' |
| 0680 | 7E186D | 1559 | DBAS6 | DC | H'7E186D3D1B37771C' |
| 0688 | 7F3F | 1560 | | DC | H'7F3F' |
| 068A | 193029 | 1561 | SCTBL | DC | H'193029001450116O' |
| 0692 | 096607 | 1562 | | DC | H'096607270337' |
| 0698 | 745692 | 1563 | SVTBL | DC | H'745692051E38110A' |
| 06A0 | B3 | 1564 | | DC | H'B3' |
| | | 1565 | | END | |

00 ERRS

What has been illustrated and described herein is a novel system for monitoring the performance of a field planting machine having a plurality of planting units. While specific embodiments have been illustrated and described herein, the invention is not limited thereto. On the contrary, various alternatives, changes and modifications may become apparent to those skilled in the art upon reading the foregoing descriptions. The invention includes such alternatives, changes and modifications insofar as they fall within the spirit and scope of the appended claims.

The invention is claimed as follows:

1. A monitor for a machine having a plurality of members to be monitored and a plurality of sensor means respectively associated with said monitored members for producing predetermined signals in response to predetermined conditions of the associated monitored members, said monitor comprising: a common signal line coupled to said sensor means, a plurality of sensor circuit means coupled in series circuit, one of said sensor circuit means being coupled intermediate each of said sensor means and said common signal line, said sensor circuit means being individually and sequentially selectable for causing a signal condition on said common signal line which corresponds in a predetermined fashion to the response of said sensor means, and monitoring circuit means coupled to said common signal line and to said series-coupled sensor circuit means and including means for sequentially selecting said series-coupled sensor circuit means and means responsive to said signal conditions for producing indication signals corresponding to the conditions of the respective monitored members.

2. A monitor according to claim 1, wherein said monitor includes at least one additional sensor associated with an additional monitored member for producing predetermined sensor signals in response to predetermined conditions of the additional monitored member and further including an auxiliary circuit coupled with said at least one additional sensor and comprising input circuit means coupled intermediate said at least one additional sensor and said monitoring circuit means for producing predetermined input signals to said monitoring circuit means in response to said sensor signals from said at least one additional sensor, said monitoring circuit means producing output signals in response to said input signals, and data storage means coupled for bidirectional data transfer with said monitoring circuit means for receiving and storing said output signals and for retaining the stored signals even in the event of loss of said input signals or output signals by said monitoring circuit means, said monitoring circuit means being responsive to said stored signals for producing corresponding ones of said indication signals.

3. A monitor according to claim 1 or claim 2 and further including observable indicator means responsive to said indication signals for producing observable indications of the condition of each of said plurality of monitored members.

4. A monitor according to claim 1 wherein said selecting means comprises timing means in circuit with said sensor circuit means for producing an enabling signal and a sequence of clock signals, and further including enabling input means in each of said sensor circuit means responsive to an enabling signal for enabling the production of said signal condition on said common signal line and enabling output means in each of said sensor circuit means responsive to one of said clock signals and said enabling input means for delivering an enabling signal to the enabling input means of the following sensor circuit means in series and for producing a disabling signal for ceasing said production of said signal condition by the associated sensor circuit means.

5. A monitor according to claim 4, wherein said monitoring circuit means includes means responsive to a predetermined signal condition on said common line for causing said enabling output means to delay production of said clock signals for a predetermined time interval.

6. A monitor according to claim 5 and further including means in said monitoring circuit means for resuming production of said clock signal and said disabling signal after said predetermined time interval.

7. A monitor according to claim 4 or claim 6 wherein said sensor circuit means includes gate means responsive to said enabling input means for producing said signal condition on said common signal line and responsive to said disabling signal for inhibiting production of said signal condition on said common signal line.

8. A monitor according to claim 4 wherein said monitoring circuit means further comprises means responsive to said predetermined signal condition on said common line for producing and storing predetermined corresponding failure data and means selectable for reading out said stored failure data.

9. A monitor according to claim 8 and further including display means and display driver means responsive to said reading out means for producing an observable indication corresponding to a failure condition of the associated monitored member.

10. A monitor according to claim 8, said monitoring circuit means further including counter means responsive to said sequential selection of sensor circuit means for producing a count signal corresponding to the identity of the monitored member associated with each selected sensor circuit means and means responsive to said count signal for providing a signal identifying the associated monitored member.

11. A monitor according to claim 10 and further including a display means responsive to said identity signal and to said failure data for producing an observable indication corresponding to a failure condition at an identified monitored member.

12. A monitor according to claim 1 wherein each said sensor circuit means includes enabling input means responsive to said selecting means for enabling production of said signal condition on said common signal line in response to the associated sensor means and enabling output means responsive to said selecting means for thereafter inhibiting production of said signal condition by the associated sensor circuit means and for delivering an enabling signal to the next series-connected sensor circuit means.

13. An auxiliary circuit for use with a monitoring system for a machine including a plurality of monitored members, a sensor associated with each monitored member for producing predetermined sensor signals in response to predetermined conditions of the monitored member and a microprocessor operatively coupled for response to said sensor signals in a predetermined sequence, said auxiliary circuit comprising: data storage means separate and distinct from said microprocessor and coupled for bidirectional data transfer with said microprocessor for receiving and storing predetermined data and operative independently of the microprocessor for retaining the stored data even in the event of loss of said data by said microprocessor; and write control means coupled to said microprocessor and responsive to the switching off of power to the microprocessor for preventing the transfer of additional data to said data storage means, said data storage means thereby retaining data previously transferred thereto.

14. Apparatus according to claim 13 wherein said auxiliary circuit further comprises input circuit means coupled intermediate at least one of said sensors and said microprocessor for producing predetermined input data in response to the sensor signals from said at least one sensor, said microprocessor generating said predetermined data in response to said input data.

15. Apparatus according to claim 2 or claim 14 wherein said input circuit means comprises scaling circuit means for producing said input data in response to said sensor signals in accordance with a predetermined scale factor and means for selectively altering said predetermined scale factor in accordance with predetermined characteristics of the sensor signals produced by said at least one sensor and in accordance with predetermined characteristics of the associated monitored member.

16. Apparatus according to claim 15 wherein said data storage means comprises serial-in, serial-out shift register means operatively coupled to receive a supply voltage even in the absence of a supply voltage at said microprocessor.

17. Apparatus according to claim 16 wherein said shift register means includes means for providing a second predetermined scale factor to said microprocessor, related in a predetermined fashion to said first scale factor for enabling said microprocessor to produce said predetermined data in accordance with said predetermined characteristics of said sensor signals and of said monitored member, respectively.

18. Apparatus according to claim 13 wherein said data storage means comprises serial-in, serial-out shift register means operatively coupled to receive a supply voltage even in the absence of a supply voltage at said microprocessor.

19. A monitor for a field planting machine having a plurality of planting units and a plurality of sensor means including seed sensor means respectively associated with said planting units for producing seed signals in response to the dispensing of seeds thereby, said monitor comprising: a plurality of sensor circuit means coupled in series circuit, one of said sensor circuit means being coupled intermediate each of said sensor means and a common signal line, said sensor circuit means being sequentially selectable for causing a signal condition on said common signal line which corresponds in a predetermined fashion to the response of the associated sensor means.

20. A monitor according to claim 19 and further including monitoring circuit means coupled to said common signal line and to said series-coupled sensor circuits and including means for sequentially selecting said series-coupled sensor circuit means and means responsive to said signal condition for producing data corresponding to the dispensing or non-dispensing of seeds by each of said plurality of planting units.

21. A monitor according to claim 20 wherein said monitoring circuit means comprises a microprocessor.

22. A monitor according to claim 20 said monitoring circuit means further including means responsive to said data for producing output signals corresponding to the dispensing or non-dispensing of seeds at or above a predetermined rate by each of said plurality of planting units.

23. A monitor according to claim 20 wherein said selecting means comprises means in circuit with said sensor circuits for producing an enabling signal and a sequence of clock signals and further including enabling input means in each of said sensor circuit means responsive to an enabling signal for enabling production of said signal condition on said common signal line and enabling output means in each of said sensor circuit means responsive to one of said clock signals and to said enabling input means for delivering an enabling signal to the enabling input means of the following sensor circuit means in series and for producing a disabling signal for ceasing said production of said signal condition on said common line by the associated sensor circuit means.

24. A monitor according to claim 19 wherein each said sensor circuit means includes enabling input means responsive to said selecting means for enabling production of said signal condition on said common signal line and enabling output means responsive to said selecting circuit means for thereafter inhibiting production of said signal condition on said common signal line and for delivering an enabling signal to the next series-connected sensor circuit means.

25. A monitor according to claim 19 wherein said field seed planting machine further includes a distance sensor means for producing a predetermined number of electrical signal pulses per unit of distance traveled thereby, said monitor further including a microprocessor for sequentially selecting said sensor circuit means and an area monitoring circuit comprising input circuit means coupled intermediate said distance sensor and said microprocessor for producing predetermined input data for input to the microprocessor in response to said signal pulses, said microprocessor generating predetermined output data in response to said input data, and data storage means coupled for bidirectional transfer with said microprocessor for receiving and storing said output data, said data storage means retaining the received and stored output data even in the event of loss of said input data and/or said output data by said microprocessor.

26. A monitor according to claim 1 or claim 19 and further including means for sequentially repetitively scanning each of said sensor circuit means a predetermined number of times, means for storing data corresponding to the respective signal condition of each sensor circuit upon each scan thereof, and means for comparing the data stored during said predetermined number of scans with preselected data and for producing an indication signal if the preselected data bears a predetermined relation to the stored data.

27. A monitor according to claim 26 and further including observable indicator means responsive to said indication signal for producing an observable indication.

28. A monitor according to claim 26 wherein said control circuit means comprises a microprocessor operating in accordance with a predetermined program.

29. A monitor according to claim 26 and further including operator accessible control means for selecting said preselected number.

30. A monitor according to claim 1 or claim 19 wherein said sensor means further include hopper level sensor means for producing an output signal when a supply of seed in a hopper thereof falls below a predetermined level and wherein said monitoring circuit is responsive to said hopper level signal for producing a further indication signal.

31. An area monitoring circuit for use with a monitoring system for an agricultural implement including distance sensor means for producing a predetermined number of electrical signal pulses per unit of distance traveled by said implement and said monitoring system including a microprocessor for operating upon input data derived from said electrical signal pulses to produce output data corresponding to the area covered by said implement, said area monitoring circuit comprising: input circuit means coupled intermediate said distance sensor means and said microprocessor for producing predetermined input data for input to the microprocessor in response to said electrical signal pulses, said microprocessor generating said output data in response to said input data and data storage means separate and distinct from said microprocessor and coupled for bidirectional data transfer with said microprocessor for receiving and storing said output data, said data storage means operating to retain said received and stored output data even in the event of loss of said input data and/or said output data by said microprocessor.

* * * * *